May 24, 1955 J. B. McGAY 2,709,039
UNIVERSAL ESCAPEMENT TYPE AUTOMATIC TAXIMETER
Filed Nov. 2, 1954 11 Sheets-Sheet 1
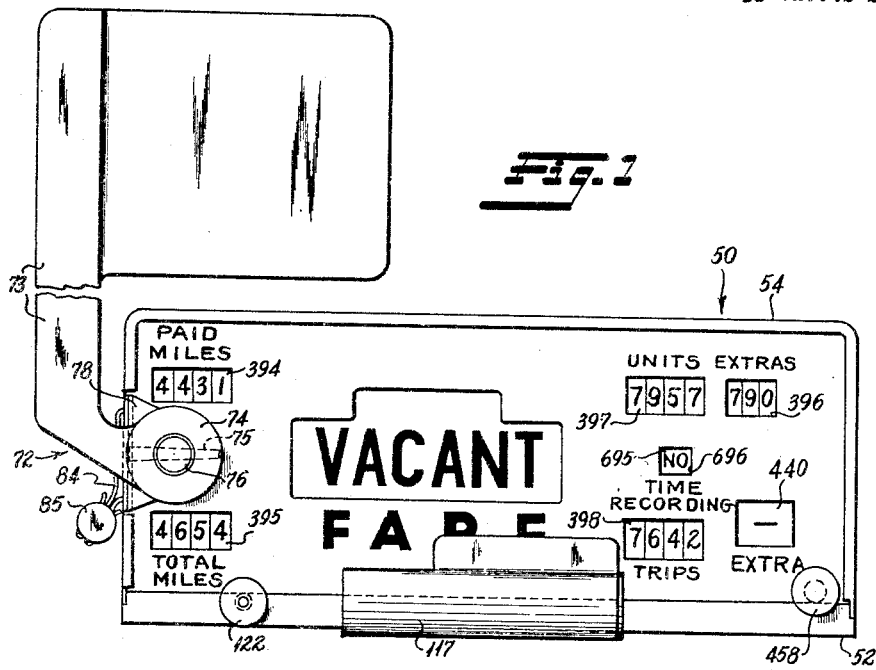
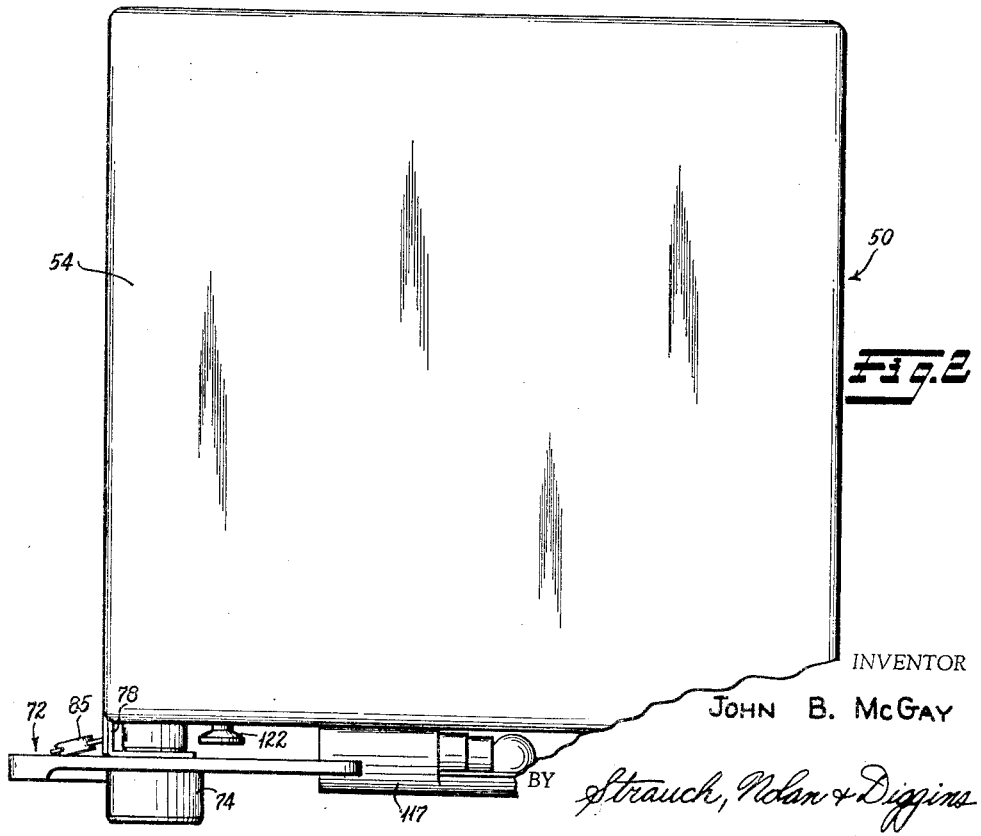
INVENTOR
JOHN B. McGAY
BY Strauch, Nolan & Diggins
ATTORNEYS May 24, 1955  J. B. McGAY  2,709,039
UNIVERSAL ESCAPEMENT TYPE AUTOMATIC TAXIMETER
Filed Nov. 2, 1954  11 Sheets-Sheet 2

INVENTOR
JOHN B. McGAY
BY Strauch, Nolan & Diggins
ATTORNEYS

May 24, 1955  J. B. McGAY  2,709,039
UNIVERSAL ESCAPEMENT TYPE AUTOMATIC TAXIMETER
Filed Nov. 2, 1954  11 Sheets-Sheet 3

INVENTOR
JOHN B. McGAY

BY Strauch, Nolan & Diggins
ATTORNEYS

May 24, 1955

J. B. McGAY 2,709,039

UNIVERSAL ESCAPEMENT TYPE AUTOMATIC TAXIMETER

Filed Nov. 2, 1954

INVENTOR
JOHN B. McGAY

BY Strauch, Nolan & Diggins

ATTORNEYS

May 24, 1955          J. B. McGAY          2,709,039
UNIVERSAL ESCAPEMENT TYPE AUTOMATIC TAXIMETER
Filed Nov. 2, 1954          11 Sheets-Sheet 6

INVENTOR
JOHN B. McGAY

Strauch, Nolan & Diggins
ATTORNEYS

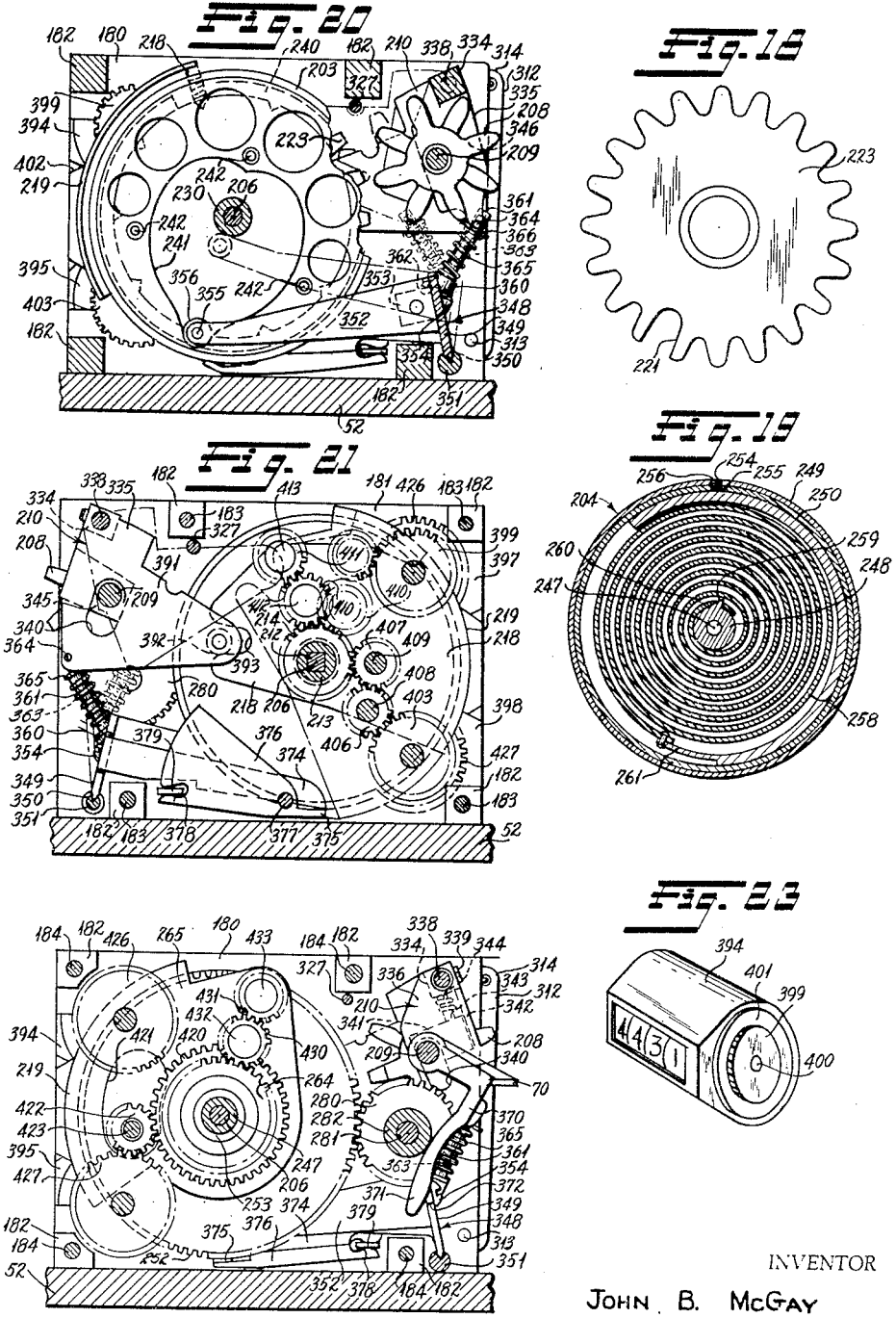

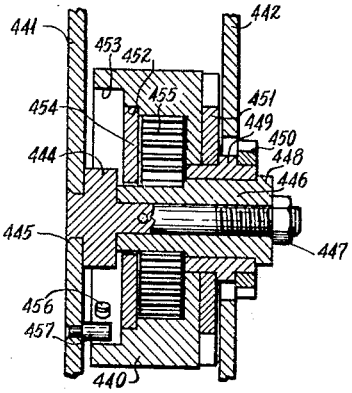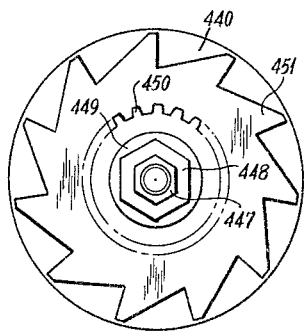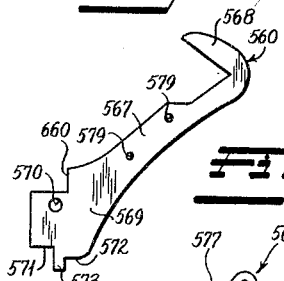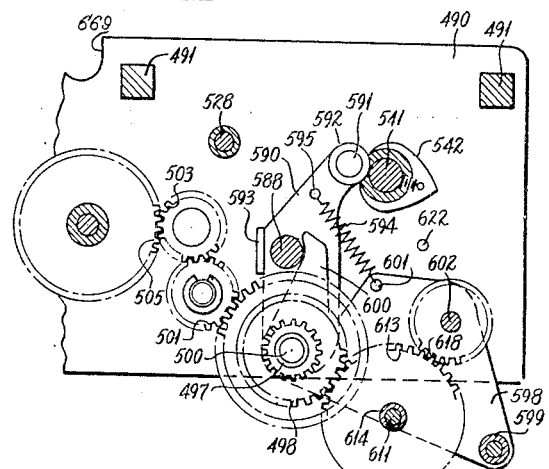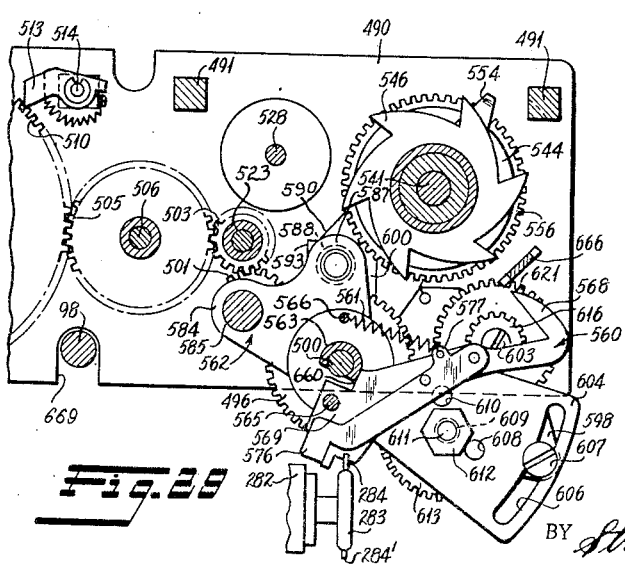

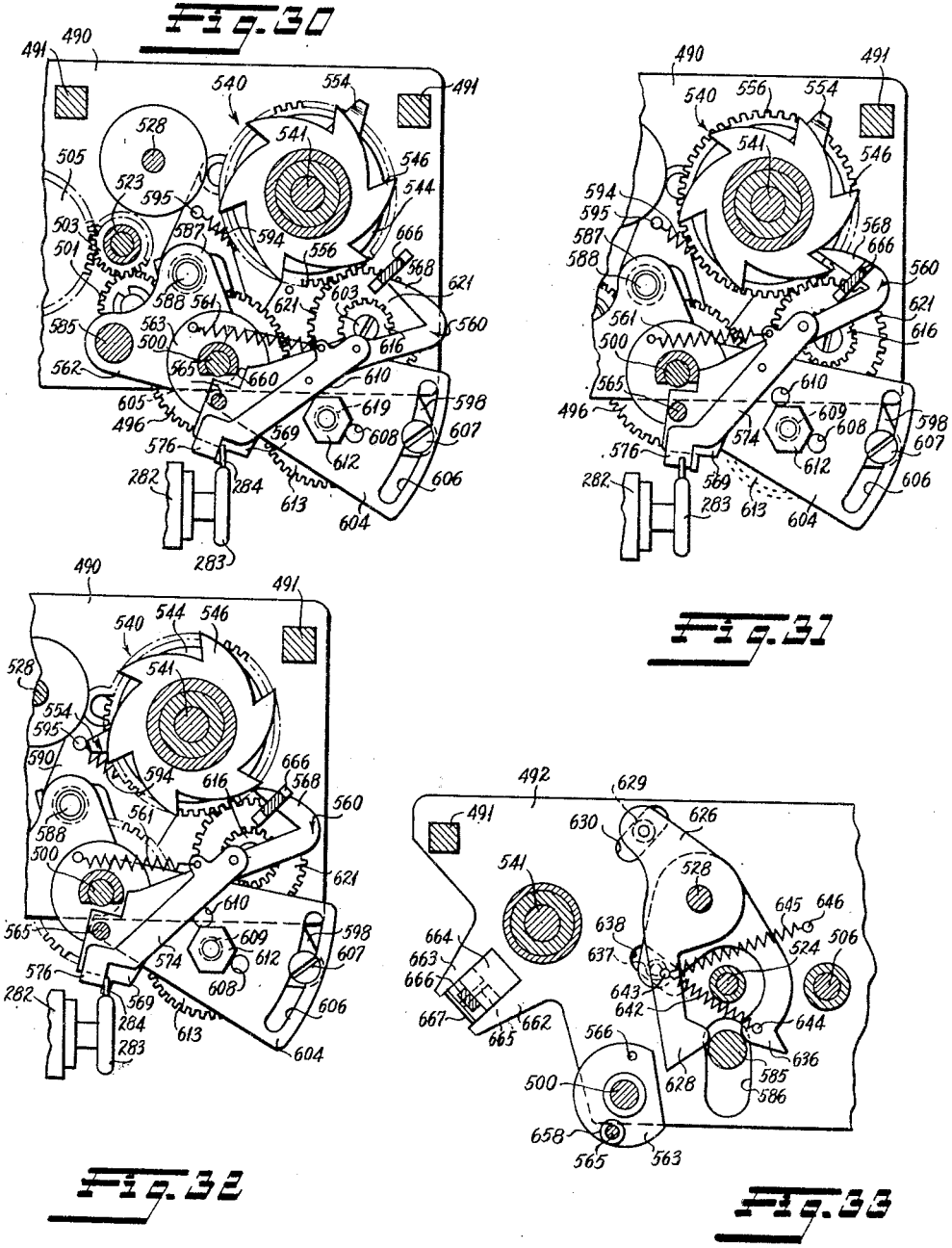

May 24, 1955
J. B. McGAY
2,709,039
UNIVERSAL ESCAPEMENT TYPE AUTOMATIC TAXIMETER
Filed Nov. 2, 1954
11 Sheets-Sheet 10
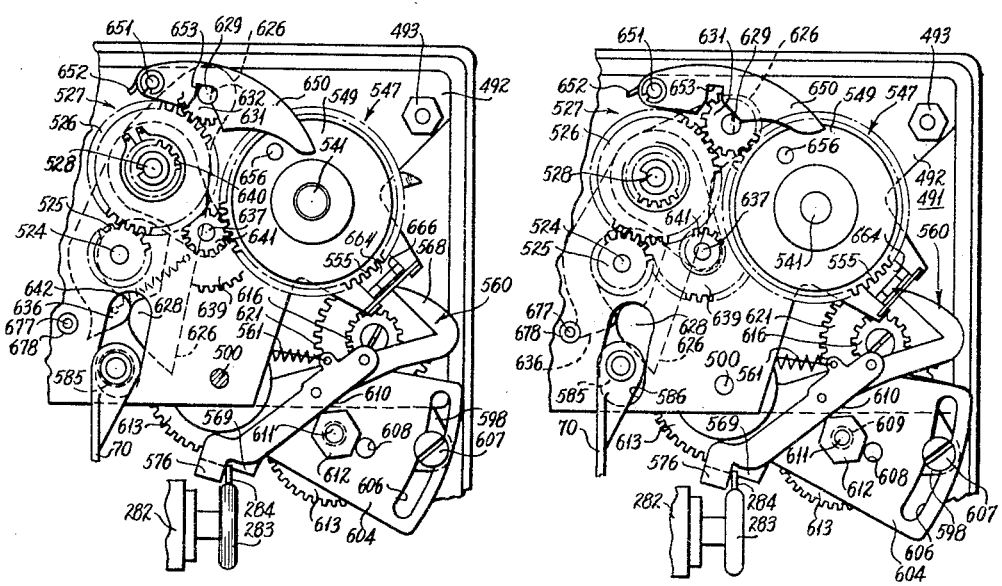
Fig. 34
Fig. 35
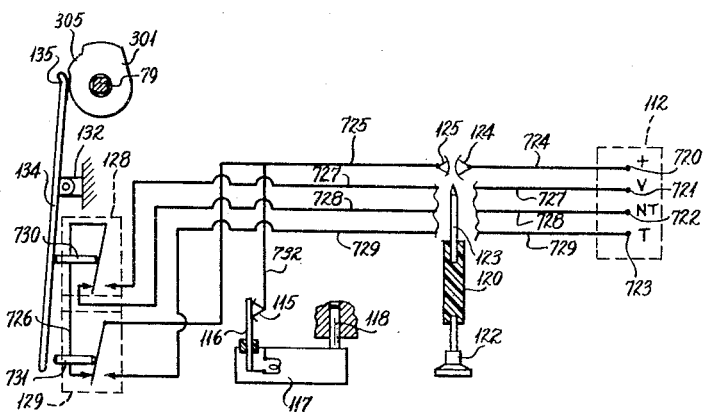
Fig. 37
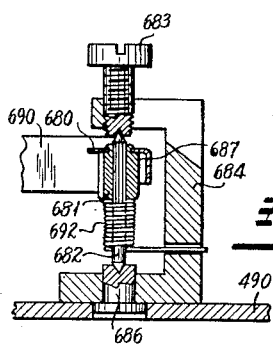
Fig. 36
INVENTOR
JOHN B. McGAY
BY Strauch, Nolan & Diggins
ATTORNEYS May 24, 1955  J. B. McGAY  2,709,039
UNIVERSAL ESCAPEMENT TYPE AUTOMATIC TAXIMETER
Filed Nov. 2, 1954  11 Sheets-Sheet 11
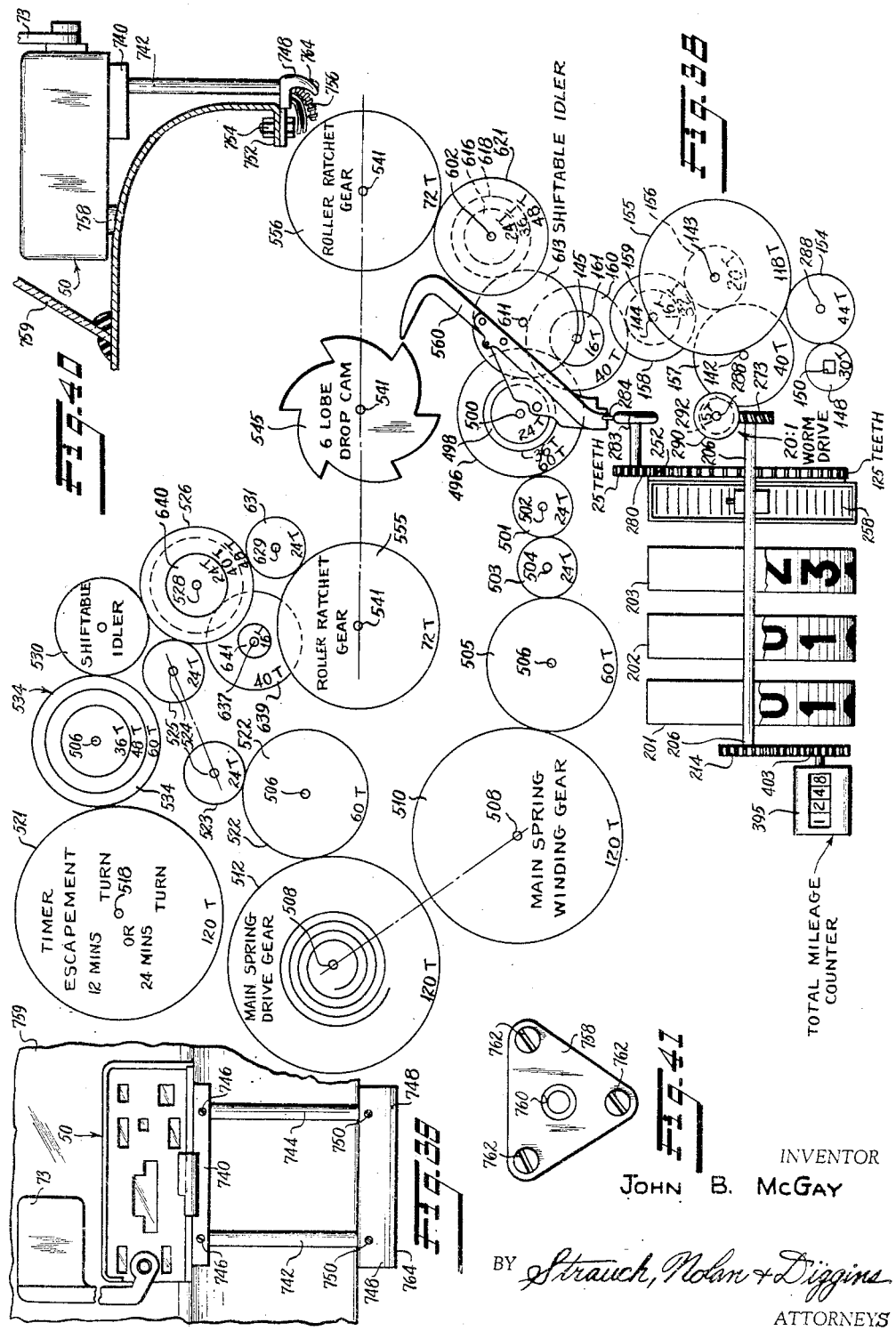
INVENTOR
JOHN B. McGAY
BY Strauch, Nolan & Diggins
ATTORNEYS

United States Patent Office 2,709,039
Patented May 24, 1955

2,709,039
UNIVERSAL ESCAPEMENT TYPE AUTOMATIC TAXIMETER

John B. McGay, Tulsa, Okla., assignor to Rockwell Register Corporation, Bellefontaine, Ohio, a corporation of New York Application November 2, 1954, Serial No. 466,407

60 Claims. (Cl. 235—30)

The present invention relates to taximeters and more particularly to a universal escapement type taximeter capable of adjustment to operate at a preselected fare rate for any selected mileage and time increments and including an escapement mechanism for actuating the fare registering drums either in response to mileage or time increments.

While taximeters have heretofore been provided and used, they have been of extremely bulky and heavy construction due to the fact that the fare registering mechanism has been driven through a relatively cumbersome pawl and ratchet mechanism including heavy drive springs stressed through suitable rugged gearing drivingly connected to the speedometer cable and heavy clockworks. These prior devices, due to their construction, necessitated comparatively complicated registering drum drive and reset mechanisms and as a result are quite expensive to produce. Representative examples of prior art taximeters found to be satisfactory, are illustrated in United States Patents to Brian C. Palmer, 2,596,164, dated May 13, 1952; Julius Gluck, 1,762,862, dated June 10, 1930; and 1,744,307, dated January 21, 1930; and J. F. Ohmer et al., 1,182,408, dated May 9, 1916.

It is, therefore, a primary object of this invention to provide an improved taximeter in which the registering indicators are driven by a spiral spring released for operation by an escapement responsive to mileage traveled and time elapsed.

Still another important object of the present invention is to provide a taximeter having registering indicators driven by a spiral spring released by a light escapement arm responsive to mileage traveled and time elapsed with clockworks the spring of which together with the registering drum drive spring, is of the well-known slip tail type automatically wound by independent gear trains driven by the mileage drive input gear.

A further object of the present invention resides in providing a taximeter having registering drums with a drum shaft rotatable with respect to the drums and directly drivingly connected to the mileage drive input gear through a gear train adapted to drive the drum shaft through one complete revolution for every mile traveled and a total mileage counter directly geared to the drum shaft through a drum shaft output gear.

Still another object of the present invention is to provide a taximeter having spiral spring driven registering indicators with a mileage and elapsed time escapement adapted for selectively releasing the spiral spring to drive the registering indicators at either a five ($0.05) cent or ($0.10) cent fare rate.

A further object of the present invention is to provide a taximeter in which the drop or jumper cam is directly time driven by a clocktype mainspring adapted to deliver a constant torque to the drop cam irrespective of the speed of rotation of the drop cam.

Another object of this invention is to provide a taximeter in which the drop cam is time driven with a constant torque regardless of the speed of rotation and, therefore, is adapted to provide fast drops as well as slow drops with the same torque available.

Still another object of this invention is to provide a flag operated taximeter with a three position flag movable back and forth through a 90° angle of movement and providing a "home" position, a mileage recording position and a mileage and time recording position.

A further object of the present invention is to provide the time drive of a mileage and elapsed time flag operated taximeter with a time driven flicker visible through the front window to indicate in one position that time is not recording and in another position that time is recording whereby the meter visibly indicates when the meter is in the mileage and time recording position.

Another object of the present invention resides in providing a taximeter having a fare drum, counter and control handle assembly unit and a drive gear, clockwork and drop cam escapement arm assembly unit adapted for independent assembly and attachment to a meter base plate.

A further object of the present invention is to provide a fare drum assembly composed of drums having transfer gear means thereon and internal heart shaped cams with a novel pinion transfer gear and reset roller unit adapted to sequentially engage the transfer pinions wtih the transfer gears and release the reset rollers from the heart shaped fare drum cams upon movement of the meter flag to meter operating position and to sequentially disengage the transfer pinions from the transfer gears and engage the reset rollers with the heart shaped fare drum cams upon movement of the meter flag to its "home" or inoperative position.

Still another object of the present invention resides in providing the novel pinion transfer gear and reset roller unit of the previous object with an arm for simultaneously shifting certain gears of the clockwork drive gear train to the drop cam and certain gears of the mileage drive gear train to the drop cam to their driving and non-driving positions and resetting the drop cam to its proper starting position as the pinion transfer gear and reset roller unit moves in response to actuation of the meter flag.

Another object of the present invention resides in providing the novel pinion transfer gear and reset roller unit of the previous object with a second arm for simultaneously moving an arcuate flasher plate between the fare registering drums and the meter window to expose and obscure the fare drums as the pinion transfer gear and reset roller unit moves in response to actuation of the meter flag.

A further object of the present invention resides in providing the arcuate flasher plate of the previous object with idler gears at its opposite ends adapted respectively to engage and disengage the paid miles counter with the drum shaft output gear and to engage and disengage the units counter with a pinion gear on the units fare drum as the pinion transfer gear and reset roller unit moves in response to actuation of the meter flag.

Still another object of the present invention resides in providing the arcuate flasher plate of the preceding objects with a ring gear adapted to rotate the trips counter as the pinion transfer gear and reset roller unit moves to its "home" or normal position in response to actuation of the meter flag.

A further object of the present invention resides in providing the pinion shaft of the pinion transfer gear and reset roller unit with an extension at the end adjacent the extras fare drum and the extras fare drum locking pawl with a release arm having a cam portion in the path of the pinion shaft extension adapted to release the extras fare drum as the pinion transfer gear and reset roller unit moves to its "home" or normal position in response to actuation of the meter flag.

Another object of the present invention resides in providing a taximeter of the flag controlled type with a simplified flag operated control cam for shifting and resetting the meter to its non-recording, inoperative "home" position and releasing the meter parts for operation upon movement of the flag to its operating positions.

Still another object of the present invention resides in providing a taximeter of the flag controlled type with a simplified flag locking mechanism to prevent movement of the flag to its operative position if the registering indicators are not reset or if the flag is not moved in the required manner.

A still further object of this invention resides in the provision of a taximeter having all desired time and mileage drive gears built into the meter whereby registering of the fare at different time and mileage increments may be effected by mere shifting of driving idler gears.

A further object of the present invention resides in providing a speedometer shaft driven taximeter with a compensating distribution gear having a fixed pitch diameter such that the input-output ratio may be varied up to 5% by increasing or decreasing the number of teeth within the fixed pitch diameter to accommodate varying tire sizes.

Still another object of the present invention resides in providing a taximeter with a novel flag shaft actuated locking mechanism for locking the cover to the base plate whereby a single sealing wire securing the flag shaft to the cover is effective to seal the meter against unauthorized access to the meter parts.

A further object of the present invention is to provide a simplified compact taximeter capable of inexpensive manufacture through component unit subassemblies of minimum number adapted for ready bodily attachment to a meter base plate.

Further objects of the present invention will appear as the description proceeds in conjunction with the appended claims and the accompanying drawings wherein:

Figure 1 is a front elevation view of a taximeter made in accordance with the present invention;

Figure 2 is a top plan view of the taximeter of Figure 1;

Figure 9 is a top plan view of the taximeter of the present invention with the cover removed and the parts illustrated in their normal inoperative or "home" position;

Figure 10 is an end view of the meter viewed from the left of Figure 9;

Figure 12A is a cut-away plan view of the mileage unidirectional drive.

Figure 17 is a sectional view taken on line 17—17 of Figure 9 showing the internal structure of the fare drum;

Figure 18 is a detail view of one of the fare drum gears;

Figure 19 is a sectional view taken on line 19—19 of Figure 17 showing the spring arrangement in the unit fare drum;

Figure 20 is a sectional view taken on line 20—20 of Figure 9, showing internal details of the fare drum subassembly;

Figure 21 is a sectional view taken on line 21—21 of Figure 9, showing other internal fare drum subassembly details;

Figure 22 is a sectional view taken on line 22—22 of Figure 9, showing still further internal fare drum subassembly details;

Figure 23 is a perspective view of a typical unitary auxiliary counter;

Figure 24 is a sectional view taken on line 24—24 of Figure 9, showing the internal structure of the "Extra" drum;

Figure 25 is a detail end view of the "Extra" drum;

Figures 26 and 27 are detail plan views of the two parts of the meter escapement lever;

Figure 28 is a sectional view taken on line 28—28 of Figure 13, showing details of the escapement subassembly, particularly the drop cam reset linkage, and the mileage idler gear carrier plate;

Figure 29 is a sectional view taken on line 29—29 of Figure 13, showing details of the escapement subassembly operating and controlling mechanisms;

Figures 30, 31 and 32 are views similar to Figure 29 but show the mechanisms in different operative positions;

Figure 33 is a sectional view taken on line 33—33 of Figure 13 looking at the bottom of the escapement subassembly upper plate;

Figures 34 and 35 are partial top plan views of the escapement subassembly showing various positions of the time drive gears;

Figure 36 is an enlarged vertical sectional view taken on line 36—36 of Figure 9 showing the time stop and indicator arm yoke;

Figure 37 is a schematic wiring diagram for the flag controlled light circuit;

Figure 38 is a schematic diagram illustrating the gear trains for driving the drop cam, winding the fare drum drive spring and winding the clockwork drive spring;

Figure 39 is a front elevation view showing a preferred taximeter mounting structure;

Figure 40 is a side elevation of the taximeter mounting structure shown in Figure 39 and Figure 41 is a bottom detail view of a meter rear support pad.

Figure 3:
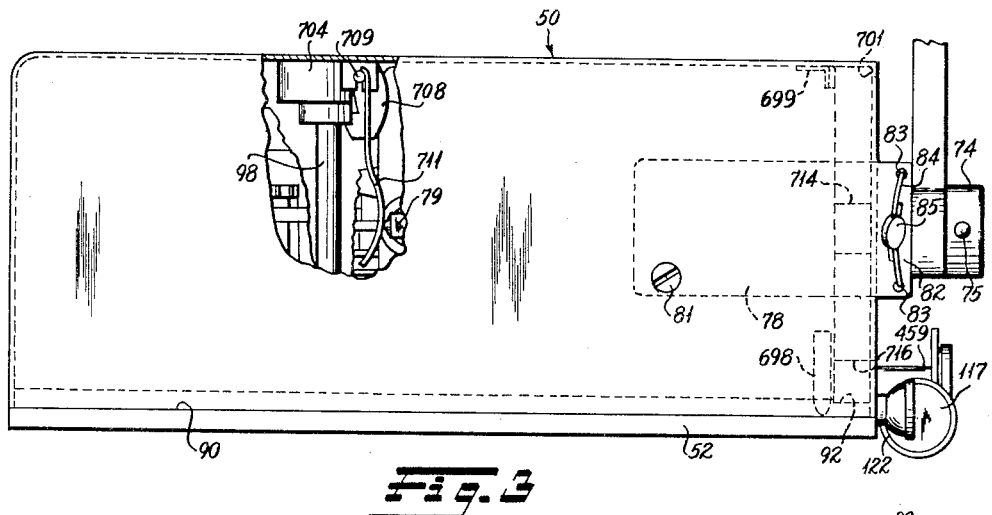
Figure 3 is a side elevation view of the taximeter of Figure 1, partially broken to show the cover latch.

With reference to the drawings, wherein like reference numerals are used to indicate similar parts throughout, the taximeter 50 (Figure 1) of the present invention is made up of a plurality of structurally cooperative subassemblies. The various subassemblies are mounted and assembled as a unit and in a manner which enables ease and convenience in removing and replacing any defective part, at the same time presenting a compact, enclosed, tamper-proof assembly, as will become apparent from the following description.

The complete taximeter 50 presents a rectangular box-like configuration, is extremely compact, simple in construction and all readings are visible through the front face. In the preferred embodiment, the height of the meter is 2 7/16 inches, the width is 6 3/4 inches and the depth is 5 1/2 inches measured from the face. These dimensions enable the unit to be readily mounted on top of the dash, in the glove compartment, inset into the dash or mounted on the partition between the front and rear of the taxicab without interfering with full use of the seating capacity. Any convenient manner of fastening the meter to the taxicab structure may be employed and various openings and threaded holes within the base plate 52 are provided for this purpose.

With reference to Figures 1, 2 and 9, it will be seen that the meter 50 comprises, in addition to base plate 52 and cover 54, two major subassemblies. As shown in Figure 9, wherein the cover is removed, the subassembly occupying the forward part of meter base plate 52 is removable as a unit and for convenience is termed the fare drum and indicator subassembly 56. Occupying the rear of meter base plate 52 is a combined clock and power driven escapement subassembly 58. Subassembly 56 is fastened to base plate 52 by two screws 60 and 61 and subassembly 58 is fastened to the base plate by screws 62 and 63. Other than gears, which intermesh when the two assemblies are mounted on the base plate, the only direct positive connections between the two assemblies is a connecting link 70 and a fare drum escapement control whose purposes and functions will be fully described hereinafter. The meter cover 54 is clamped and locked to the base plate by novel means, to be described, actuated upon final assembly of the flag arm and shaft generally indicated in Figures 1, 2, 3 and 9 by reference character 72.

The flag assembly (Figures 1 and 9) comprises flag arm 73 having an annular collar shaped boss 74 at one end thereof. Fastened within boss 74 by a tapered pin 75 is an arbor post 76 formed with an integral annular flange 77 spaced a slight distance from the side face of boss 74. Between the flange 77 and the face of boss 74 a flag assembly retaining plate 78 is journalled and is bent in an angular configuration having a short apertured portion which journals on post 76 and a longer flat portion which passes beside and engages the drum subassembly 56.

The arbor post 76, beyond flange 77, is reduced in diameter and has an axial blind bore in its inner end (Figure 9) for receiving in force fit engagement one end of a square shaft 79. Shaft 79 cooperates with the drum assembly, in a manner to be later described, when the flag and connected arbor are rotated by the operator.

At the rear lower corner of retaining plate 78 a hole 80 is drilled which, in assembled form as seen in Figures 3 and 10, cooperates with a screw 81 passing through the cover and into the drum assembly to retain the flag assembly in operational relationship to the meter assembly. A part of the long portion of the retaining plate 78 immediately adjacent the bend cooperates with a lug 82 formed integral with the cover 54. Mating holes 83 are drilled through the lug 82 and retaining plate 78 and provide means whereby a wire 84 may be passed through the retaining plate and cover, twisted and fastened with a lead seal 85 to completely seal the meter unit. As will become apparent as the description progresses, the unit when sealed as described is completely tamper-proof and has no openings, slots or apertures to enable an unprincipled operator to insert wires or tools for manipulating the readings to his own advantage.

Base plate

Figures 6, 7, 8:
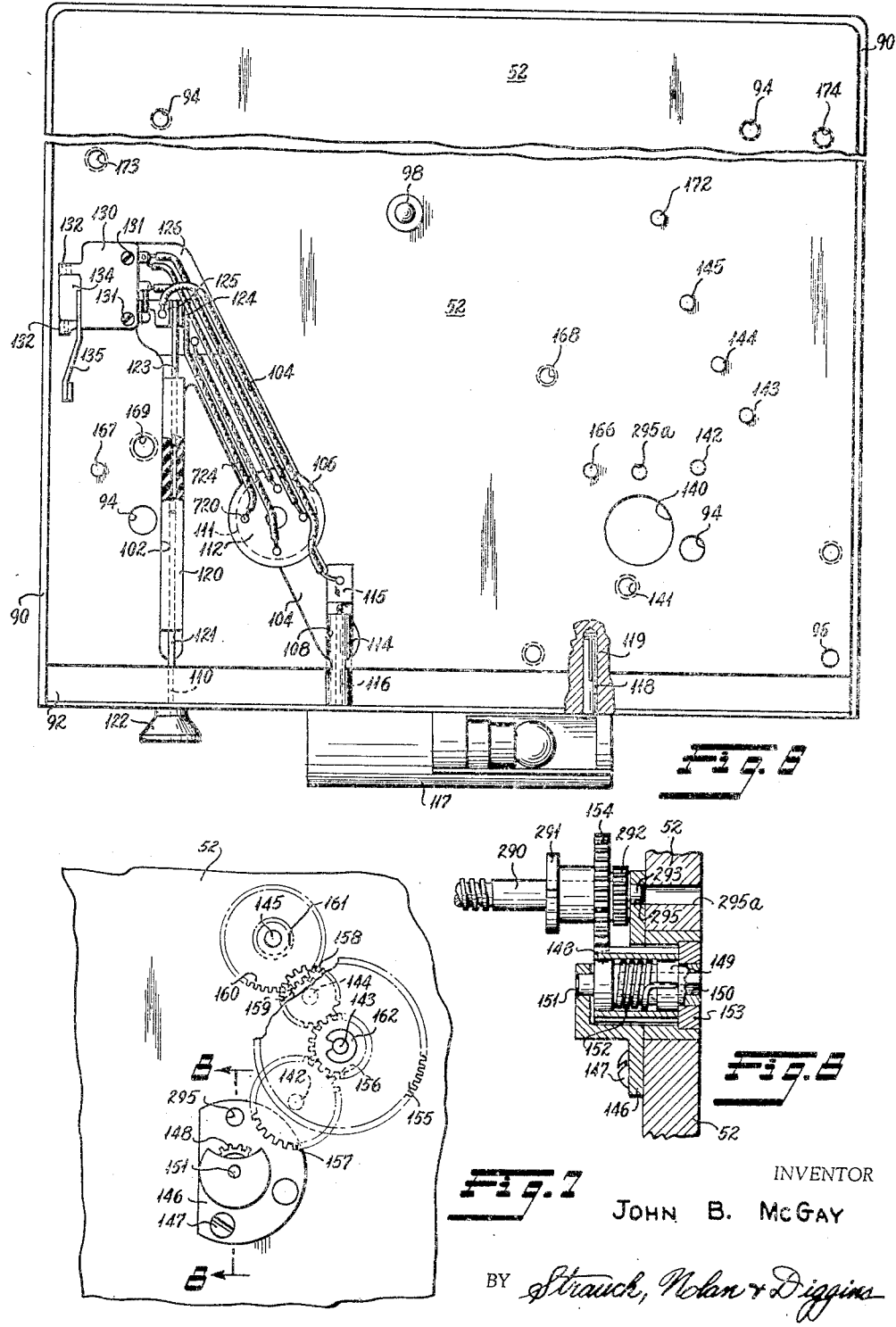
Figure 6 is a top plan view of the meter base plate with the fare drum and escapement subassemblies and the base mounted gear train removed.
Figure 7 is a partial top plan view of the base plate showing the speedometer cable adapter and the base mounted gear train.
Figure 8 is a sectional view taken on line 8—8 of Figure 7 showing the speedometer cable adapter.
Figure 8:
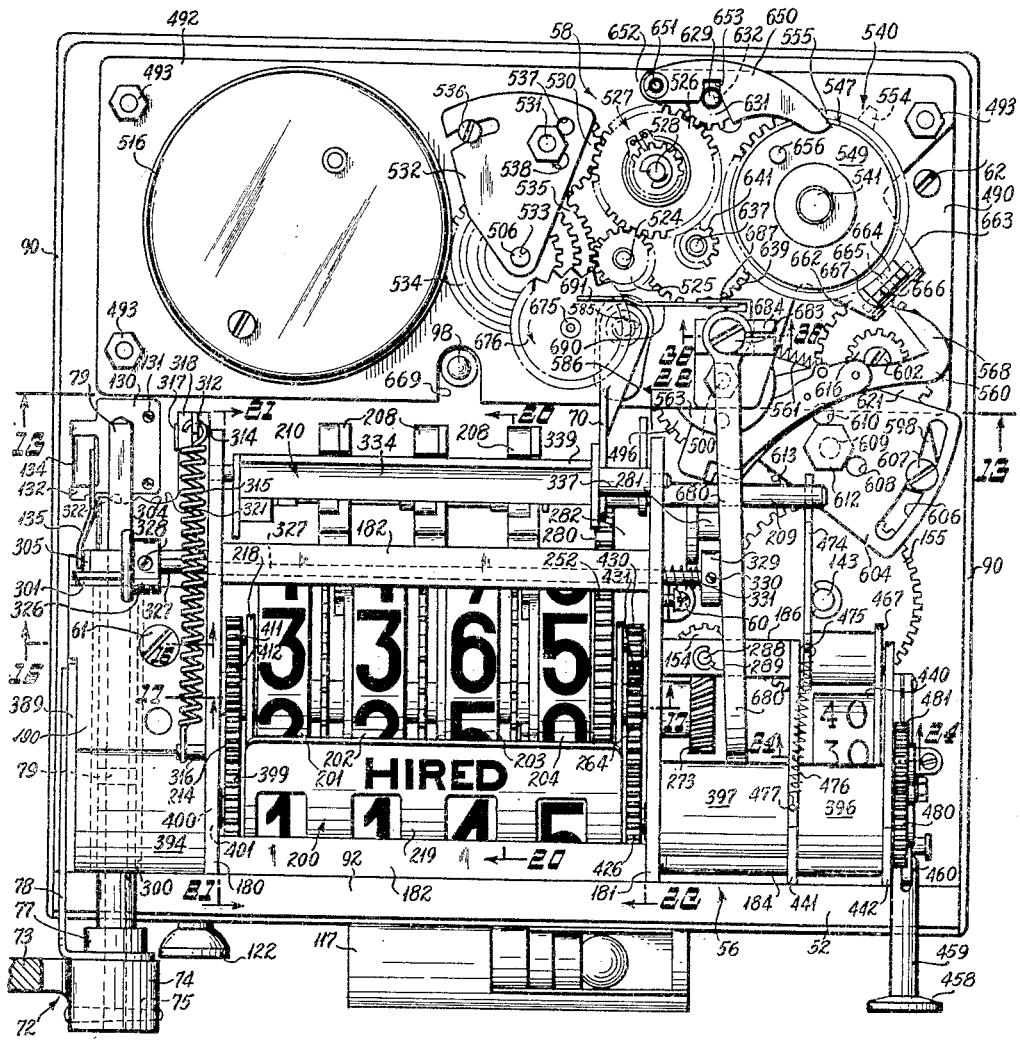

With particular reference to Figure 6, the base plate 52 comprises a sheet of aluminum or aluminum alloy approximately 5½ inches by 6¾ inches and of suitable thickness. Plate 52 is suitably milled, reamed, drilled and tapped to receive appropriate components of the meter assembly. The side and rear edges are recessed to form a shoulder 90 and the top surface, adjacent the front edge, is milled to provide a groove 92 (Figures 6 and 10), the shoulders and groove operating with the cover to form an off-set seating relationship between the cover and base that will effectively prevent insertion of tools or wires to manipulate the meter mechanisms.

Figure 11:
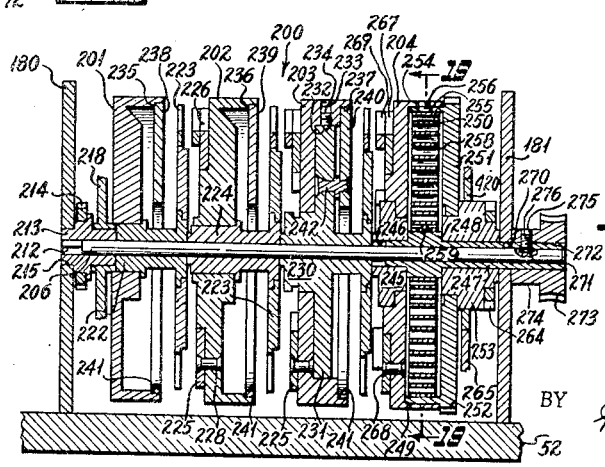
Figure 11 is a broken end view of the meter viewed from the right of Figure 9 with the escapement subassembly removed.

Various holes 94 are drilled in the base plate 52 to provide a means of attaching the base of the meter to support structure in conventional and well-known manner. At the front right hand corner, adjacent groove 92, a blind hole 96 is located and cooperates with a fixed pin on the cover 54 to help maintain the cover position. Slightly off-set from the center of plate 52 an upstanding locking post 98 is suitably fastened to the base plate and, as seen in Figure 11, the top end of the locking post has a reduced head portion 99 with an undercut annular shoulder 100 for cooperation with the cover locking device to be described later. The front left corner of the top of the base plate is milled to form two angularly related intersecting elongated recesses 102 and 104. The recess 104 is enlarged at its mid-portion by a circular recess 106. The terminating end of recess 104 intersects with a bore 108 and the terminating end of recess 102 intersects with a small diameter drilled hole 110; both the bore 108 and drilled hole 110 extend perpendicularly from the front edge of plate 52. Within the circular recess 106 a reduced diameter counterbore extends through the base plate leaving a radially extending annular shoulder 111 within the recess. A dielectric terminal plate 112 is force fit within recess 106 against annular shoulder 111 and provides means for electrical connections to the vehicle power supply and to signal devices commonly used on taxicabs. Received within the bore 108 is a tubular dielectric member 114 projecting into the recess 104 having a spring clip 115 suitably attached adjacent the end. Tubular member 114 and spring clip 115 provide a single pole receptacle for receiving one terminal 116 of a meter lamp unit 117. The second or ground terminal of the lamp unit 117 comprises a split post 118 adapted to be received, with a spring fit, within a blind hole 119 drilled perpendicularly into the front edge of plate 52.

A dielectric block 120 is disposed with a sliding fit, in the groove 102 with its top surface flush with the top surface of plate 52. Fastened to the front end of block 120 by means of a shaft 121 passing through drilled hole 110 is a push-pull button 122. The length of block 120 is designed to permit a limited axial movement whenever the button 122 is manipulated in or out. A brass pin 123, fixed in the rear end of block 120 can slide in to make or break engagement between spring clips 124 and 125 whenever the push-pull button is manipulated. Clips 124 and 125 are fastened to a dielectric wafer 126, press fitted within the juncture of recesses 102 and 104. It is apparent that a pull on button 121 will remove pin 123 from between the clips 124 and 125, breaking a circuit from one clip to the other and when button 121 is pushed in the pin 123 will contact spring clips to complete a circuit from one spring clip to the other. The described switch controls the power supply to the meter circuit to be described hereinafter.

Figures 15, 16:
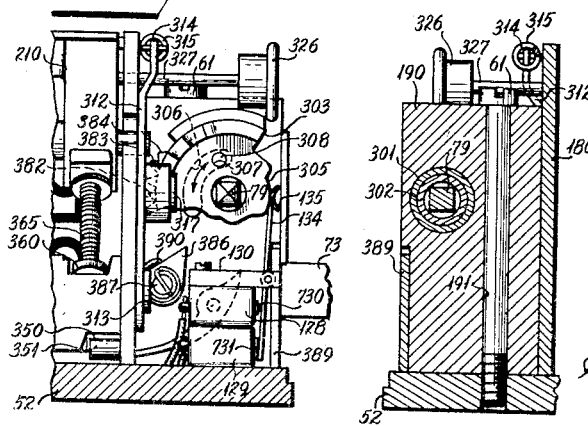
Figure 15 is a vertical sectional view showing only the right hand portion of Figure 14 with the flag arm moved 90 degrees to the time and mileage recording position.
Figure 16 is a sectional view taken on line 16—16 of Figure 9 through the flag block.

Mounted adjacent the side of the intersection of recesses 102 and 104 are two microswitches 128 and 129, one placed on top of the other in stacked relation (Figures 10 and 15). Each microswitch is of the single pole, double throw type, spring loaded to one position. On top of the uppermost microswitch 128 a brass hinge plate 130 is positioned (Figures 6, 10, and 15), and switches 128 and 129 and plate 130 are fastened together and mounted to the base plate 52 by two screws 131 passing through the stacked units. Hinge plate 130 has two ears 132 projected toward the left hand edge of the base plate. Journalled for pivotal movement between the two ears 132 is a double arm microswitch actuator 134. As seen in Figure 10, the lower depending arm of actuator 134 is positioned over the actuating buttons of both microswitches 128 and 129 so pivotal movement of actuator 134 will actuate the microswitches in sequence. The upper end of actuator 134 is bent forward to form an arm 135 deformed to provide a cam follower surface thereon for cooperation with a cam. The cam is operated coincidental with the meter flag operation. The sequential operation of the switches by the cam will be described more fully hereinafter in connection with the circuit description.

At the right hand side of the forward half of plate 52, means are provided for fixedly mounting a portion of the operating gear train. With particular reference to Figure 6 this means comprises an aperture 140, threaded hole 141 and gear journal posts 142, 143, 144 and 145 fixed in the base plate.

Looking now at Figures 7 and 8, a flanged adapter unit 146 is positioned within aperture 140 and held by a screw 147 passing through the unit flange and screwed in threaded hole 141. Adapter unit 146 (Figure 8) contains a hollow pinion 148. A shaft bushing 149, having a square axial recess 150 therein for receiving the end of a mileage drive cable of conventional construction, passes through pinion 148 and is journalled at 151 in one end of the adapter unit. A uni-directional spring drive 152 connected to shaft 149 and coacting with the inside cylindrical surface of the pinion 148 prevents reverse rotation of pinion 148 during any rearward movement of the taxicab. The shaft bushing 149 and pinion 148 are retained in the adapter unit by a retaining ring 153 in the base of the adapter. Pinion 148 meshes with an idler gear 154 (Figures 9 and 14), on the drum assembly, which in turn meshes with a gear 155 (Figure 7) journalled on post 143. Gear 155 will hereinafter be termed the distance adjustment gear because the number of teeth about the periphery may be varied to adjust for different tire sizes on the vehicle. Integrally fastened to the distance adjustment gear 155 on its lower side is a small gear 156 meshing with a gear 157 journalled on post 142 and with an idler gear 158 journalled on post 144. Integral with idler gear 158 on its lower surface is a pinion gear 159 in meshing engagement with an idler gear 160. Integral with idler gear 160 is pinion gear 161, both being journalled on post 145.

Installation of the gear members on the plate is made in the following order. Adapter unit 146 is inserted and fastened to base plate 52, gear 157 is placed on post 142, gear 160 is placed on post 145, integral gears 158 and 159 are placed on post 144 with gear 159 meshing with gear 160, and distance adjustment gear 155 is then placed on post 143 with pinion gear 156 meshing with gears 157 and 158. A spring clip 162, fastened to the end of post 143, retains gear 155 and the other gears of this train against axial movement on their posts.

When the major subassembly units are fastened to the base plate, appropriate gearing, carried by the subassemblies, will intermesh with gears 148, 157 and 161. A schematic drawing of the gear trains in the meter unit is shown in Figure 38 for clarity of illustration and will be fully described later.

In the base plate adjacent the aperture 140, a drum assembly locating pin 166 is fixed. A second locating pin 167 is located parallel therewith and adjacent the left hand edge of the plate. Adjacent each locating pin 166 and 167 are threaded holes 168 and 169. Pins 166 and 167 engage appropriate recesses in the drum assembly 56 and previously mentioned drum mounting screws 60 and 61 engage the threaded holes 168 and 169 to rigidly fasten the drum assembly on the base plate.

At the right hand side of plate 52 and parallel with locking post 98 a third locating pin 172 is fixed. Two tapped holes 173 and 174 are located respectively at the left hand side of plate 52 slightly rearward of locking post 98 and rearwardly thereof on the right hand side of base plate 52. Locating pin 172 and locking post 98 cooperate with and properly locate the drive and escapement subassembly 58 relative to pinion gear 161. Screws 62 and 63 are screwed into holes 173 and 174 and rigidly mount the subassembly 58 to the base plate.

*Drum and indicator subassembly*

*Drum and drum drive mechanism.*—With reference to Figures 9–25, the drum and drum drive subassembly, with its various component parts, will now be described. The framework of this assembly consists of a left hand vertically extending plate 180 and right hand vertically extending plate 181 interconnected and held in spaced parallel relationship by four square rods 182, two at the rear and two at the front of the plates in vertical spaced relation (Figures 20 and 21). The two rear rods 182 are fastened to the left and right side plates by countersunk screws 183 and the two front rods 182 are fastened to the left hand plate by similar countersunk screws 183 (Figures 10 and 21). The right hand ends of the front rods are internally threaded to receive long screws 184 (Figures 11 and 22) utilized in attaching the trips counter, units counter, extras drum and extras counter minor subassembly to the right side plate 181. As shown in Figure 11, screws 184a thread into rear rods 182 and a third screw 185 engages the rear of the extras, units and trips counters subassembly and screws into a post 186 which in turn is staked to the right hand side plate 181. The counters subassembly and interrelated parts will be described in full detail hereinafter.

Mounted to the outside of the left hand plate 180 by screws (not shown) is an aluminum block 190 (Figures 10, 15 and 16), carrying component parts for the flag and flag operating mechanism and providing means for clamping the total miles counter and the paid miles counter against left hand side plate 180. A through bore 191 in block 190 (Figure 16) receives screw 61 used to fasten the drum assembly to the base plate.

Figure 14:
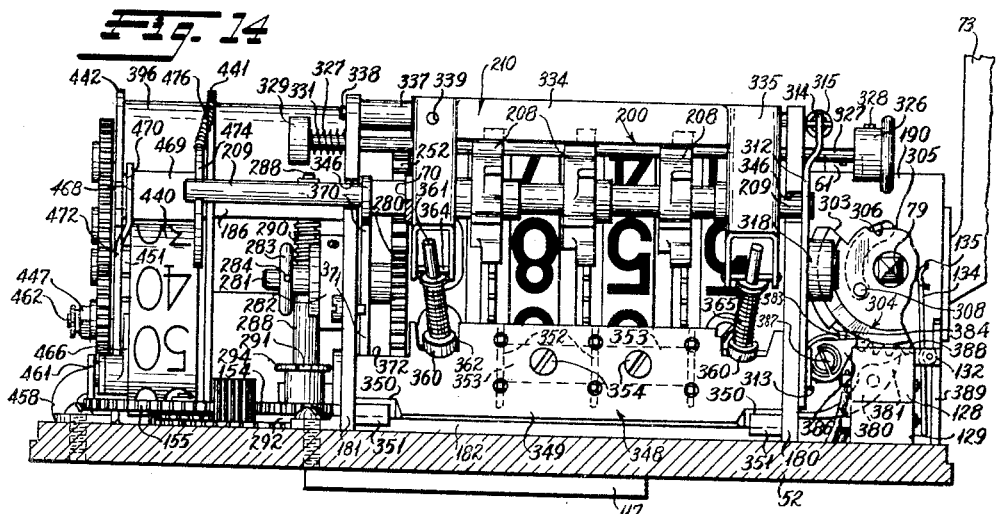
Figure 14 is a vertical sectional view taken on line 14—14 of Figure 9 looking into the back of the fare drum subassembly.

Mounted between the two plates 180 and 181 is the fare drum assembly 200 (Figures 9, 14, and 17). The present embodiment as best seen in Figures 9, 14a and 17, utilizes four fare drums, viewed from left to right, the ten dollar drum 201, the dollar drum 202, the ten cent drum 203, and the unit drum 204. All four of the fare drums are rotatively mounted on a horizontal shaft 206 which is journalled by elements to be presently described in side plates 180 and 181. Immediately behind the fare drums, three transfer gears 208 are journalled on a common shaft 209 (Figure 14) which in turn is journalled in a shiftable yoke member 210. These transfer gears enable proper counting movement of the fare drums in a manner well known to those experienced in the art.

In this taximeter the fare drums are not driven directly from the speedometer cable as is common in the prior art. Instead the speedometer drive is utilized to wind a main fare drum spring within the unit drum 204. The spring is of the slip-tail variety which can be wound only to a certain degree of tightness, any subsequent winding causing the tail end connection to slip from its connecting means. The spring force thus developed within the unit drum biases that drum toward a counting rotation and the unit drum is released to rotate under the stored force by use of a novel escapement mechanism that controls rotation of the unit drum in steps proportionate to either distance traveled or time elapsed. Figure 17 discloses a sectional view of the fare drum assembly including the means for winding the main spring within the unit drum. The main shaft 206 extends from a point to the right of side plate 181 through all four fare drums and terminates in a squared end 212. Carried on the squared end 212 is a bushing 213 fixedly carrying a gear 214. Bushing 213 is drilled and broached in such a manner as to slide over the end of the squared portion of shaft 206 and be retained against further axial movement along the shaft and is journalled in a hole 215 in side plate 180 thus journalling the left end of shaft 206. Note that gear 214 lies closely adjacent the inner side of plate 180, for a purpose to become apparent. Journalled on the bushing 213 at the end remote from plate 180, is a side arm 218 of a flasher plate 219 (Figures 9 and 20) and abutting the right hand end surface of collar 213 is a bushing 222 for the ten dollar counter. Bushing 222 fixedly carries the drum 201 and also has affixed, at its right hand end, a counter gear 223. The counter gears for the ten dollar, one dollar and ten cent counters are identical and one is shown in Figure 18.

Note that one of the spaces 221 between teeth in the counter gear is enlarged. The purpose of the enlargement is to facilitate assembly of the counter reset cam arms.

Journalled on shaft 206 immediately adjacent bushing 222 is a counter bushing 224 fixedly mounting the one dollar counter drum 202 and the counter gear 223. Drum 202 has an annular recessed portion on its left hand surface adjacent the periphery, to receive an annular wheel 225 having one gear tooth space 226 formed in its periphery. Gear tooth space 226 has an axial width approximately twice that of the annular wheel 225 and its side surface is substantially co-planar with the adjacent side surface of the hub section of counter gear 223. Counter gears 223 have a peripheral undercut portion 227 adjacent the half of gear tooth space 226 thus preventing interference and binding between the two wheels. The annular wheel 225 is suitably fastened to drum 202 as by flush rivets 228.

Adjacent the one dollar bushing 224, ten cent counter bushing 230 is journalled on shaft 206 and is provided with a radial flange 231 having ten equally spaced indentations 232 in its peripheral surface. Ten cent counter drum 203 is journalled on bushing 230 with the inner surface of the drum peripheral flange journalled on the periphery of flange 231. The peripheral flange of drum 203 is suitably tapped as at 233 to receive a positioning screw 234 having a conical end adapted to fit within a selected one of the indentations 232 in the peripheral surface of flange 231 and thereby secures drum 203 to the bushing 230 assuring unitary rotation of the bushing and drum. Affixed to the right hand portion of bushing 230 is a counter gear 223 similar to the counter gear on drums 201 and 202. By the arrangement just described, it is seen that the ten cent drum 203 may be relatively angularly adjusted on bushing 230 by loosening the positioning screw 234 and repositioning the drum to a new location, but in operation the drum, bushing and gear will rotate as an integral unit.

It is noted that the three drums 201, 202 and 203 are rotatably mounted on shaft 206 and receive rotative movement by engagement with their associated transfer gears 208. On the right hand edge of the peripheral flange of all three drums 201, 202 and 203, a recess is milled to form annular seats 235, 236 and 237, respectively. Within each respective recess and seating on the annular seats are tool steel cam wheels 238, 239 and 240. The three cam wheels are identical, and as seen in Figure 20, have an internal cut-out providing a heart shaped cam surface 241. The heart shaped cams 241 provide, in combination with other structure to be described, a means for resetting the three fare drums 201, 202 and 203 whenever the meter is operated or positioned in the "home" or "vacant" position. Two of the cam wheels 238 and 239 are press fitted within drums 201 and 202 while cam wheel 240 has a running fit within the periphery of drum 203. Cam wheel 240 is rigidly fastened to bushing 230 by swaged stud members 242 seen in Figures 17 and 20. Resetting of cam 240 will position busing 230 whereby drum 203 is reset to its preset value. Thus if the initial fare is to be thirty cents drum 203 will be positioned on bushing 230 to show the numeral "3" at the front of the wheel when the cams are in re-set position. Since all present taxi rates start below a dollar, the one dollar drum 202 and the ten dollar drum 201 have their heart shaped cams permanently press fitted within the peripheral flange to position the numeral "0" on drum 202 and a horizontal dash line on drum 201, at the front of the meter, whenever the cams re-set the drums.

Returning now to Figure 17, it will be seen that a unit counter bushing 245 abuts the ten cent counter bushing 230. The unit counter bushing has a bore 246 of larger diameter than shaft 206 and rotatably receives a reduced end portion of a hollow main spring arbor 247.

The main spring arbor 247 is fitted over the end of shaft 206 and extends from outside of the side plate 181 to its journal fit within bushing 245. The portion 248 of arbor 247 adjacent bushing 245 is enlarged to form a shoulder resting against the side surface of bushing 245. The periphery of bushing 245 is provided with a recessed annular shoulder to fixedly receive a counterbored matching shoulder in drum 204 whereby drum 204 is fixedly carried by bushing 245. The periphery of drum 204 consists of an axially extending annular flange 249 receiving a similar axially directed flange 250 on a main spring drum 251. The main spring drum 251 is provided with gear teeth 252 around its periphery and has non-rotatably fixed, within a coaxial counterbore, a bushing 253 which journals on the extended portion of arbor 247. The unit counter drum 204 and main spring drum 251 are integrally joined to assure their rotation as a unitary assembly by means of tapped openings 254 and 255 in flanges 249 and 250 respectively, for receiving a set screw 256. The cooperating drums 204 and 251 provide an annular chamber of slightly larger axial extent than and surrounding the enlarged portion 248 of the main spring arbor to enclose a flat coil spring 258. Approximately at the axial mid portion of the enlarged part of arbor 247 (Figures 17 and 19), a single pin 259 is integrally formed and is adapted to engage a slot 260 formed at the inner end of coil spring 258. The pin 259 is so shaped as to engage slot 260 when the arbor 247 is rotated in a clockwise direction. Fixed to the tail or outer end of coil spring 258 is a thicker strip of coil spring 261 of a length sufficient to reach approximately two-thirds of the way around the inside of peripheral flange 250 of spring drum 251. With this arrangement, whenever the spring is wound to a predetermined maximum tension, the thicker tail spring 261 will be pulled radially inward from the periphery of drum 251 allowing the spring to slip clockwise around the inner periphery of the drum. After one or several unwinding revolutions of the spring, the thick spring tail 261 will again frictionally engage the drum peripheral flange 250 and prevent the spring from further unwinding. This is a conventional sliptail spring.

On the right hand end of bushing 253, a gear 264 is fixedly mounted for rotation therewith. It will be appreciated since bushing 253 is fixed to the spring drum 251 which in turn is fixed to the unit counter drum 204, that the unit counter drum and gear 264 will rotate as a unit. Gear 264 through a gear train, to be explained hereinafter, is the drive gear for the units counter seen in the upper right corner of Figure 1. The periphery of bushing 253 provides a journal for the right hand arm 265 of flasher 219 which is of fabricated construction as will be later pointed out. Fixed to the left hand surface of drum 204 is gear wheel 267 fastened by rivets 268 in a manner similar to that of wheel 225 on drum 202. Since the disclosed meter is adaptable to operate at a rate of five or ten cents per distance or time unit, the exterior circumference of drum 204 is inscribed with the numerals 0 and 5 recurring around the drum, there being five zeros and five numerals five at equally spaced intervals. Since a shift from one zero to the next zero by unit wheel 204 is required to register ten cents, the gear wheel 267 is formed with five equiangularly spaced tooth spaces 267 about its periphery formed in a manner similar to that described for tooth space 226, and enabling a counter transfer operation to the ten cent drum only after the unit drum shifts two numeral spaces.

To the right of drum bushing 253, shaft 206 and encircling arbor 247 pass through and are journalled within bore 270 in side plate 181. Adjacent the right end of shaft 206 a flat surface 271 is milled in the shaft circumferential surface. Immediately adjacent this flat surface 271, arbor 247 has a drilled opening 272. A worm gear 273 is fitted over the end of arbor 247 having a running clearance between plate 181 and shoulder 274. Shoulder 274 has a tapped opening 275 therein receiving a set screw 276 that will pass through the opening 272 in arbor 247 to bear against flat 271 of shaft 206 and thus integrally connect the worm gear 273, arbor 247 and shaft 206.

Through a series of gearing, to be later described, worm gear 273 is rotated by the mileage drive cable to turn arbor 247 and shaft 206 in a clockwise direction as viewed in Figure 22. Operation of the mileage cable by forward movement of the vehicle will thus wind the spring 258. It is also apparent that rotation of worm gear 273 through shaft 206 will rotate gear 214 at the opposite end of the shaft 206 during all forward travel of the vehicle. Gear 214 continuously engages, through a train of gears to be described, the "total miles" counter to record actual miles traveled by the vehicle.

With respect to Figures 9, 14 and 22, drum gear 252 engages a pinion gear 280 which is fixedly mounted on a shaft 281 journalled in a bushing 282 which is fixed in side plate 181. Integral with the shaft 281 is an annular wheel like flange 283, and radially projecting from the periphery of flange 283 is a stop pin 284. Pin 284 is adapted to coact with an escape lever, connected with the escapement subassembly, which is intermittently actuated when the meter is set for a ten cent unit fare to permit the wheel flange 283 and shaft 281 to rotate in 360° intermittent steps. Whenever the pin 284 abuts the escape lever and rotation of shaft 281 is prevented, the pinion gear 280, through engagement with drum gear 252, will prevent unwinding of the drum 204 and connected spring 258. It follows, therefore, that when the mileage drive shaft is operating and the drum gear 252 is held against rotation that spring 258 will be wound.

Viewing Figure 9 and Figure 14, a shaft 288 is journalled in post 186 with its axis arranged vertically. The upper end of shaft 288 comprises a reduced portion passing through the post 186 and retained therein by a shoulder adjacent the reduced portion and a spring clip 289 engaging the grooved end of shaft 288. Immediately adjacent and below the reduced end portion a worm 290 is formed on the shaft 288 and meshed with worm wheel 273. Intermediate the worm 290 and the lower end of the shaft an annular groove 291 is formed, and adjacent the lower end of shaft 288 an integral shaft drive gear 292 is located. The end of the shaft 288 is provided with a reduced stub post 293 (Figure 8). The previously mentioned idler gear 154 is journalled on shaft 288 between the upper face of gear 292 and the groove 291 and a spring clip 294 cooperates with the groove 291 and the end face of a shoulder on idler pinion 154 to maintain the pinion in axial position on shaft 288. When the drum subassembly is mounted on the base plate 52, stub post 293 on the base of post 288 is journalled in a hole 295 (Figures 7 and 8) properly located in the flange of adapter unit 146, idler gear 154 meshes with the driven pinion 148 and the distance adjustment gear 155, and the integral gear 292 on post 288 meshes with previously mentioned idler gear 157. Base plate 52 in alignment with opening 295 is provided with an opening 295a to accommodate stub post 293 should it be of a length sufficient to protrude beyond the surface of the base plate. It is thus seen that rotation of the mileage driven shaft, drives, through gears 148, 154, 155, 157, 202 and worm 290, the worm wheel 273 to wind the main spring within drum 204 and also to rotate the mileage gear 214 on the opposite end of shaft 206.

*Flag shaft mechanism.*—Referring now to Figures 9 and 10, the previously mentioned block 190 is fastened to the right hand side of plate 180 by countersunk screws (not shown) whose heads are on the inside of plate 180. The front and rear faces of block 190 form parallel vertical plane surfaces. Passing from front to rear of block 190 just above the mid point is a through bore 300 provided with a brass bushing 301. Journalled within bushing 301 is a combined flag shaft arbor and cam 302 made of tool steel (Figures 10, 14 and 15). The rear end of arbor 302 comprises a cam which has radial camming portions 303 and 305 and an axial camming portion 304. On the rear face of block 190 adjacent and concentric with bore 300, an arcuate groove 306 of slightly greater than 90° extent is milled. The radial flange of the cam is drilled at 307 to receive a pin 308 that cooperates with the arcuate groove 306 and limits rotation of arbor cam 302 to the arcuate extent of the groove. The inner end of arbor cam 302 is broached to a square opening of appropriate size to receive the square shaft 79 of the flag assembly 72. Figures 9 and 10 it is seen that with the flag subassembly fastened to the drum and counter assembly, the end of square shaft 79 extends beyond the cam part of arbor cam 302 to a position above the hinge plate 130. This feature is utilized to actuate the cover locking device and will be described later.

On the left hand side of plate 180, adjacent the rear edge, a yoke actuating lever 312 (Figures 10, 14, and 22) is pivotally mounted by means of a stud 313 fixed in plate 180. An ear 314 at the free end of lever 312 provides an anchor for one end of a tension spring 315, the outer end of the spring being fastened to a spring post 316 toward the forward edge of plate 180, thus biasing lever 312 toward the front of the drum assembly. Fastened at the mid point of lever 312, with its axis perpendicular to the flag shaft axis is a stud member 317 having a ball bearing roller 318 journalled thereon. With lever 312 biased toward the front of the assembly, roller 318 will be biased into engagement with the axial cam portion 304. Axial cam portion 304 has three detents 320, 321 and 322. Detent 320 engages roller 318 when the flag is in a vertical position, as shown in Figures 9 and 10, and biases the lever arm toward the rear of the assembly against the spring tension. The axial positions of detents 321 and 322, relative to the cam arbor 302, are the same and engage the roller 318 when the flag is positioned at 45° and 90° respectively, and at these positions permits the lever 312 to be biased forwardly by spring 315.

Positioned above the cam portion of arbor cam 302 is a collar flange 326 fixedly positioned on a rod 327 by set screw 328. The rod 327 passes through plates 180 and 181 (Figures 9 and 10) directly below the top rear square post 182. At the opposite end of rod 327 a collar 329 is fixed by set screw 330. Between collar 329 and side plate 181 a light spring 331 is retained to bias the collar together with rod 327 and flanged collar 326 to a right hand position. By mechanisms to be described hereinafter, collar 328 when biased to the right hand position by spring 331, prevents the timing mechanism from operating.

Looking now at Figures 14 and 15, when the flag is moved past the 45° position to the 90° position, radial cam portion 303 will engage the inside of the flanged collar 326, drawing collar 326, rod 327 and collar 329 to the left against the bias of spring 331. This will condition the time mechanism to operate and drive through the escapement to operate the fare drums. As shown in Figure 10, the flanged collar 326 has a groove cut in its lower right hand quadrant. This groove merely allows clearance between the flanged collar and block 190 and serves no other specific purpose.

*Transfer gear and drum reset mechanism.*—Referring now to Figures 9, 14, 20, 21 and 22, the previously mentioned yoke assembly 210 consists of a squared tool steel rod 334 provided at both ends with a depending bracket, 335 and 336, of channel shape cross section. Adjacent the depending bracket 336 and integrally affixed to its upper end is a hollow spacer 337. A bore extends through the hollow spacer 337 and through the steel rod 334. Received within this hollow bore is a shaft 338 journalled in holes in the upper rear corners of plates 180 and 181. The yoke assembly 210 is thus pivotally mounted to swing about the axis of shaft 338 which is parallel to the axis of the main drum shaft 206. After assembly the yoke 210 is rigidly locked to shaft 338 by a set screw 339 and it will be apparent from the drawing that shaft 338 is thus prevented from axial movement relative to side plates 180 and 181.

The depending channel shaped brackets performs several functions, namely, to shiftably guide and position transfer wheels 208 into and out of engagement with the fare drum gears 223 and wheels 225 and 267, to move the flasher plate from a "home" position to fare indicating position, and to actuate the fare drum resetting cam mechanism. Movement of the flasher to indicating position will simultaneously actuate the "trips" counter one unit, engage the "paid miles" counter with the constantly driven mileage gear 214 and engage the "units" counter with the unit gear 264 in a manner that will be described hereinafter.

Both side flanges of the depending brackets 335 and 336 have slots 340 formed in their lower portions as seen in Figures 21 and 22. Within depending bracket 336 is a guide block bushing 341 resting on the upper part of shaft 209 and guided within the channel of member 336. A boss is formed on the top of block 341 to guide a spring 343 whose other end is retained on a depending boss 344 located on the lower surface of square rod 334. Shaft 209 extends through slot 340 in bracket 336, journals the three transfer gears 208 and passes through the slot 340 in bracket 335. A brass bushing block 345 is journalled on shaft 209 and guidingly fitted within the channel of depending bracket 335. Both ends of shaft 209 extend through slots 346 formed in side plates 180 and 181, one such slot being clearly shown in Figure 11. With reference to Figures 10 and 14, it will be seen that the end of shaft 209 passing through plate 180 engages a slotted opening 347 in the yoke actuating lever 312. Movement of the lever 312 between its two limit positions will translate rod 209 forward or backward within slots 346. As can be visualized in Figures 20 and 22, a forward translation of rod 209 will swing the yoke 210 forward or toward the front of the assembly, simultaneously positioning transfer gears 208 into engagement with the appropriate fare drum gears 223. In the rearward position of shaft 209, the transfer gears are locked against rotation on the shaft by engagement of two teeth with the lower surfaces of the square shaft 334 (Figure 20). As the shaft 209 and gears 208 are translated forward, the slot 346 will guide the shaft and gears downwardly out of engagement with the square shaft 334. Downward movement of the shaft relative to the depending brackets 335 and 336 is permitted by means of the previously mentioned slots 340 in the depending brackets. The gears 208 will start to mesh with their appropriate drum gears prior to complete disengagement from square shaft 334. The combined coaction of the guide slots 340, guide blocks 341, 345 and the side plate guide slots 346 will maintain the axis of shaft 209 parallel to the main drum shaft 206 during its translating movement into and out of engagement with the drum gears.

When the yoke actuating lever 312 is positioned in the rearward position, thus withdrawing transfer gears 208 from engagement with the drum gears, drums 201, 202 and 203 are disengaged and are free to rotate about shaft 206. The unit drum 204 is prevented from rotating by coaction of pin 284 with a part of the escapement mechanism as will become apparent later. When the transfer gears 208 are thus disengaged, the meter is positioned in an inoperative position and it is necessary at this time to return the ten cent, dollar and ten dollar drums to an initial reading. This is accomplished by a cam arm assembly indicated generally in Figure 20 as 348. The assembly 348 comprises a rear tool steel knife plate 349 with knife edges 350 on the extremities of the lower edge. Suitably fastened to the lower rear corners of side plates 180 and 181 are inwardly projecting grooved steel studs 351 providing a pivotal groove for receiving knife edges 350. The plate 349 is thus able to pivot on an axis formed by the cooperation of knife edges 350 with the grooved studs 351. A cam arm subassembly comprising three elongated arms 352 integrally welded to base blocks 353 (Figures 14 and 20), is fastened to the inner surface of knife plate 349 by means of screws 354 whereby the cam arms 352 extend substantially perpendicular from the inside face of knife plate 349. The three cam arms 352 pass between the gear drums and the associated gear wheels 223. At the free end of each cam arm 352 a stud 355 journalling a cam roller 356 is fixed, as by staking, to the end of the cam arm.

In Figure 20 it is seen that enlarged grooved heads 360 of short shafts 361 bear against knife edges 362 formed at both ends of the upper edge of knife plate 349. The right and left hand shafts 361 are identical, hence reference characters will be the same on each. A slot 363 (Figure 20) is provided along the length of shaft 361 and terminates short of the shaft end. Passing through the slot 363 and fastened to the lower tips of the side members of depending channel brackets 335 and 336 is a cross pin 364. Encircling each shaft 361 and bearing against the enlarged head portion 360 is a compression spring 365 retained at its opposite end by a washer 366 abutting the pin 364. Compression spring 365 thereby biases the enlarged grooved head 360 of shaft 361 into abutting engagement with knife edge 362. When shaft 209 is in its rearward position, as shown by full lines in Figure 20, the pivot pin 364 lies to the rear of a line passing from the pivot points 350 of knife plate 349 and vertically through the knife plate (phantom lines) resulting in a spring force biasing knife plate 349 toward the forward position. When the shaft 209 is translated to its forward position, as shown by phantom lines, the pivot pin 364 and spring 365 will be repositioned as indicated by the phantom lines showing Figure 20. This new pin position is to the left of a line drawn through the full line showing of knife plate 349 and results in a spring force biasing plate 349 toward the position shown in phantom lines. To positively assure the removal of cam arms 352 from their biased position in engagement with the apex of the heart cams, a bent lever 370, best seen in Figure 22, is freely journalled on shaft 209 and normally rests on the surface of bushing 282. When the shaft 209 is translated to a forward position, engagement of lever 370 against the bushing 282 will swing the free end 371 into engagement with an edge 372 of a recessed portion of the plate 349, thereby positively forcing plate 349 to its rearward position, regardless of the bias of spring pressed shafts 361.

As clearly shown in Figure 20, the cam arm assembly 348 when tilted to the forward position will engage rollers 356 with the internal peripheries of the heart shaped cams 241. When the cam assembly is biased toward this position by springs 365, the associated drums are freed from locking engagement with their transfer gears 208 as previously stated. Consequently the coaction between the cam rollers 356 and the heart shaped cam surfaces 241 will cause the counter drums to rotate until rollers 356 rest in the apexes of the heart shaped cams 241. This position will limit the forward pivotal movement of knife plate 349 while the rear pivotal limit is determined by abutment of rollers 356 against the drum bosses 222, 224 and 230 as shown by phantom lines in Figure 20.

As previously mentioned, the ten dollar and the one dollar cams are press fit in their respective drums in a predetermined position so, when they are reset by the cam centering device, a dash-mark and a zero, respectively, will show up in the fare window (Figure 1). As the cam in the ten cent drum is fixed to the drum boss 230 by the rivets 242, centering of that heart shaped cam will always result in the boss being returned to a predetermined position. However, since the indicator drum 203 is adjustable about the periphery of boss 230, any desired initial setting of the ten cent drum may be made and upon a resetting actuation of the cam assembly, drum 203 will return to the pre-set reading which in the present embodiment is a thirty cent reading. At this time attention is directed to the previously mentioned enlarged tooth space in each of the counter gears. In the assembled form, this tooth space on each drum is directly in line with the apex of the heart shaped cam surface. This enables the three cam arms, upon initial assembly, to be inserted radially within the enlarged slots and shifted axially into position to place the rollers within the periphery of the heart cams in the three counter drums 201, 202 and 203.

The foregoing reset levers and the transfer gears are arranged to be actuated in sequence upon operation of the transfer gear yoke. Thus the yoke in moving to a meter operative position will translate the transfer gears into engagement with the counter gears before the reset levers and rollers are spring biased out of the reset position, and the yoke, when moved to the meter inoperative position will remove the transfer gears from engagement with the counter gears prior to the reset levers and rollers being spring biased into engagement with the counter drum heart cams. As a consequence, effective resetting and transfer gear engagement of the drums without freeing the drums for uncontrolled movement is assured.

Shown in Figure 21, knife plate 349 includes at one end an integral biasing arm 374 extending substantially parallel with the cam arms 352. The end of arm 374 is adapted to engage a lug 375 on a weighted lever 376 when the cam assembly has properly reset the counter drums and is in the forward position. When arm 374 contacts lug 375, the weighted lever 376 will be positioned as shown in Figure 21 against the torque action of its weight tending to turn the lever in a counterclockwise direction. Lever 376 is pivoted on stud 377 which is fastened to side plate 180 and, as is apparent, the major weight of lever 376 is opposite pivot stud 377 from lug 376 which will positively assure weighted movement in the counterclockwise direction. Adjacent the lower surface of the weighted end of lever 376 a slot 378 is provided and encompasses the tail end 379 of a cam locking pawl 380 (Figures 14 and 15). When lever 376 is free to be rotated by its weighted end, the cam locking pawl 380 will be positioned to ride against a radially notched periphery of arbor cam 302, however, if the cam assembly is in the reset position and arm 374 abuts lug 375, the lower portion of slot 378 in lever 376 will engage the tail 379 of pawl 380 and pivot its locking end 381 away from possible engagement with the notched periphery of cam 302.

This is a safety feature to prevent reoperation of the flag if the fare drums are not reset.

The arbor cam 302 (Figure 15) includes a peripheral sector that lies adjacent block 190 and has notches 382, 383, and 384 formed in the periphery and is shown in Figure 14 in the "home" or "vacant" position wherein a locking pawl 386 is pivoted on stud 387 and engages with notch 383 to prevent rotation of the arbor cam 302 in a clockwise direction. To enable clockwise rotation of the arbor cam, the cam must first be forcefully rotated in the counterclockwise direction sufficiently to cause an end piece 388 of the cam peripheral flange sector to abut and move against the bias of a brass spring plate 389, to position a second deeper cam notch 384 in line with the pawl 386. Upon entering notch 384, pawl 386 under influence of spring 390, is moved to an intermediate position to be subsequently swung counterclockwise upon clockwise movement of the cam out of notch 384 biasing spring 390 in the opposite direction and allowing continued or clockwise rotation of the cam arbor 302 by manipulating the flag. Upon passage of the peripheral end piece 388 clockwise past pawl 386, spring 390 restores pawl 386 to its intermediate position for subsequent contact by cam 302 to position it in its "home" or "vacant" locking position. If at the time clockwise rotation of arbor cam 302 is attempted, the counter wheels are not reset, engagement of lever 376 with tail 379 will prevent clockwise rotation of the cam arbor 302 to a meter operative position. This additional locking feature is provided to prevent attempts by unscrupulous operators to catch the counter wheels prior to their being completely reset and thus obtain a high fare reading on the counters prior to starting a trip. Several notches similar to 383 are provided between notches 382 and 383 to prevent reverse movement of the flag arm between 45° and 0° unless the pawl has passed through notch 384 when the flag is in 0° or "home" position.

*Mileage, extras, units and trip counter mechanism.*—Seen in Figure 1 are the faces of five individual counter units substantially similar to the counter unit shown in Figure 23. In the upper left hand corner is a "paid miles" counter 394. Immediately below that counter is a "total miles" counter 395. At the extreme right upper portion a totalizing "extras" counter 396 is located and adjacent its left hand side is a "units" counter 397. Below counter 397 is a total "trips" counter 398. Each of counters 394, 395, 396, 397 and 398 are integral units whose structure is conventional and well known, the counter (Figure 23) being operated by a rotating gear 399 protruding from one side face, and one revolution of the gear, in each counter, will rotate the unit counting wheel, or the extreme right hand wheel, one complete revolution. As is conventional, each complete revolution of one wheel will rotate the adjacent counter wheel to the left one-tenth of a revolution.

With regard to Figures 9, 10 and 20, counter 394 is located with its drive gear 399 on the inside of plate 180 and the counter casing on the outside of the plate. Gear 399 is fixed on a shaft 400 journalled in a bushing 401 which is fixed to the counter casing. The counter is assembled to the drum subassembly by insertion from the front edge of plate 180 with bushing 401 fitting within and at the base end of slot 402 to thereby position gear 399 in a predetermined relation to plate 180. When inserted, the face of counter 394 is substantially flush with the plane along the front edges of plates 180 and 181. Counter 395 is mounted in a manner similar to that described for counter 394 to locate gear 403 on the inside of plate 180. The two counters 394 and 395 are retained in position by the previously mentioned spring plate 389 fastened to block 190 by screws 404. The forward portion of plate 389 contains a countersunk hole for receiving a long screw 405 passing directly under counter 394 and screw threaded into a tapped opening in plate 180. After counters 394 and 395 have been inserted into position, screw 405 is tightened and retains the counters in position by a friction fit between plate 389 and plate 180.

The right hand wheels of counters 394 and 395 indicate tenths of miles and are preferably coated with a color to contrast with the other wheels in those counters, which is conventional. Figure 21 discloses that gear 403 is connected with the drum shaft mileage gear 214 through idler gears 406 and 407 journalled on posts 408 and 409, respectively, which are fixed in the inner wall of side plate 180. Through a gear train of predetermined ratio, to be described, the drum shaft mileage gear 214 will make one complete revolution during each mile traveled by the vehicle. Gear 403 is the same size and has the same number of teeth as the mileage gear 214, hence will also make one revolution for each mile traveled. Located above the mileage gear 214 are two intermeshed idler gears 410 and 411, journalled on posts 412 and 413 respectively, the posts being fixedly mounted to the side arm 218 of the flasher unit. Gears 410 and 411 are so positioned that gear 410 constantly meshes with drive gear 214 regardless of the position occupied by flasher unit 219, thus both idler gears 410 and 411 are continuously driven by the mileage gear 214. As disclosed, flasher unit 219 is in the "home" or "vacant" position and idler gear 411 although being rotated by gear 410 does not mesh with and drive another gear. However, when the meter is conditioned to a fare registering position, the flasher assembly 219 will be positioned, as shown in phantom lines, whereby idler 411 engages the "paid miles" gear 399. Gear 399 being the same size and having the same number of teeth as mileage gear 214, will properly register the "paid miles" whenever the meter is in a fare registering position.

As shown in Figure 21 the side flange of depending bracket 335, located adjacent the side plate 180, includes an integral forwardly projecting arm 391. A stud 392 is fixed in the free end of arm 391 to project transversely therefrom and engage a V-slot 393 formed in the tail end of flasher arm 218. It will thus be apparent that when the transfer gear shaft 209 is translated forward from the position shown in Figure 17, and yoke assembly 210 pivots about shaft 338, the lever arm 391 through cooperating stud 392 and groove 393 will rock the flasher 219 clockwise to the position shown in phantom lines. This rocking movement of flasher 219 allows the counter fare drums to be viewed through the cover windows, actuates the "trips" counter one count and engages the "paid miles" counter and the "units" counter.

Viewing Figure 22, it is disclosed that flasher arm 265 includes a gear tooth insert 420 formed as a ring whose inner periphery provides the flasher unit journal on the outer circumference of unit counter gear drum boss 253. In the forward part of flasher arm 265 and immediately adjacent the teeth of gear insert 420 an arcuate opening 421 is provided having the center of its radius coincident with the center of gear insert 420. The opening is of predetermined length and has one side formed by the teeth of gear insert 420. Positioned within the arcuate opening 421 and meshing with the teeth of gear insert 420 is an idler gear 422 journalled on a post 423 which is fixedly mounted in side plate 181. It will be apparent that the centers of idler gear 422 and gear insert 420 are fixed relative to one another and a rocking movement of the flasher assembly 219 will rotate gear insert 420 and in turn rotate the idler gear 422. The number of teeth in the gear insert 420 is so chosen that the angular movement of flasher assembly 219 from a "home" or "vacant" position to a "tariff recording" position will rotate idler gear 422 an angular distance equivalent to four times the tooth pitch. This angular distance transferred to the trips counter unit 398 will add one unit as will be presently seen.

Counter units 397 and 398 include drive gears 426 and 427, respectively, and are inserted into slots formed in the forward part of plate 181 in a manner similar to that described for counters 394 and 395. Counters 397 and 398 differ from the previously described counters in one respect, they include within the counter casing a ratchet and pawl mechanism permitting unidirectional rotation only of the counter, i. e., the counter may only be rotated in the forward direction and any rotation of their gears in the reverse direction does not result in movement of the counter wheels. As seen in Figure 22, gear 427 is continuously engaged with idler gear 422, so any time gear 422 is rotated by a rocking movement of the flasher assembly 219, gear 427 will be rotated through an arc equal to four times the tooth pitch. Since the perimeter of gear 427 is provided with forty teeth, rotation through an arc equal to four times the tooth pitch will move the counter shaft one tenth of a revolution to record and indicate one additional unit on the trips counter. Thus, each time the flag is rotated away from "home" position, the flasher assembly 219 will be actuated away from the "home" or "vacant" position and will simultaneously record one additional trip on the appropriate counter.

Posts 432 and 433 are fixed disposed on the flasher side arm 265 and provide journals for intermeshing idler gears 430 and 431. Idler 430 in turn meshes with the unit fare wheel gear 264. Gear 431 will mesh with the "units" counter gear 426 when the flasher assembly 219 is rocked in a forward direction in a manner similar to that described for the intermeshing of idler gear 411 with the "paid miles" counter gear 399. Gear 426 is of the same diameter and has the same number of teeth as gear 264. Consequently one complete revolution of gear 264 will result in a complete revolution of the unit wheel of counter 397 whenever the flasher arm 219 is in its forward position. It will thus be seen that whatever the fare increment is that is set on the periphery of the unit fare counter wheel, each time one of these increments is added to the fare indication, the "units" counter 397 will add a unit to the total units indication. The unit fare drum, as disclosed, has five cent increments, hence each drop of five cents is recorded as one unit of the "units" counter and a ten cent drop records 2 units on the "units" counter.

The extra drum assembly and operating mechanism is clearly shown in Figures 9, 11, 14 and 24. "Extras" counter 396 and the extra drum 440 immediately below the counter are mounted between two vertical plates 441 and 442 thus forming a minor subassembly fastened to and carried by plate 181 through the medium of long screws 184, and screw 185 threaded into a tapped opening in the end of post 186. When the extras subassembly is fastened to the side plate 181, plate 441 will clamp against the ends of "units" counter 397 and "trips" counter 398 to frictionally hold these two counters in position against plate 181. The large extra drum 440, in the present embodiment, has nine numerals inscribed in its peripheral surface in equal increments from 10 to 90, and has a dash line inscribed between the numerals 10 and 90, to indicate no extras recorded, constituting 10 equally spaced positions on the peripheral surface of the drum. Figure 24 is a sectional view of the extra drum 440 and discloses the main support for drum 440 as comprising a post 444 rigidly fixed to plate 441 by swaging, as indicated at 445, and extending through an aperture in plate 442. A hollow arbor member 446 is fitted over post 444 and clamped thereto by a nut 447 on the end of the post. The outer end of arbor 446 has an integral annular flange 448 provided to abut and axially retain the drum bushing 449 in journalled relation on the arbor. The drum bushing, at its end adjacent flange 448, fixedly carries a ring gear 450, and is provided with an adjacent annular ange which, in assembled relation, is substantially coplanar with plate 442 and positioned within the aforementioned aperture. Abutting the bushing flange on the opposite side from gear 450 and fitted on the bushing, as by a force fit, is a ratchet wheel 451. Adjacent and abutting the ratchet wheel 451 is the extra drum 440, also force fit on bushing 449, to constitute a unitary rotatable assembly, comprising drum 440, ratchet wheel 451 and gear 450 all integrally fixed to bushing 449 and journalled on arbor 446. The left hand portion of drum 440 includes two stepped recesses 452 and 453. The recess 452 provides an annular seat for a cover plate 454 enclosing a coil spring 455 within the drum. The spring 455 has its inner end fastened to arbor 446 and its outer end to the inner surface of drum 440 and is arranged to rotate the drum 440 in a clockwise direction as viewed in Figure 25. By means of a stop 456 projecting radially inward from the inner periphery of drum recess 453 and arranged to coact with a stop pin 457 projecting from side plate 441, the drum 440 is permitted to be rotated approximately 345° in a counterclockwise direction and the spring 455 will always exert a force tending to bias the drum back to its original position, defined by the stop pins.

Drum 440 is arranged to be operated one-tenth of a revolution to indicate each extra charge and to this end a push button 458 is provided at the lower right hand corner of the meter having an integral shaft 459 projecting from the interior through the front face to the exterior of the meter where it may be actuated by the taxicab operator. The integral shaft 459 pivotally attaches at its interior end 460 (Figure 11) to a lever 461 which is pivoted to swing about a fixed pivot post 462 on the side of plate 442, and has a stud post 463 fixed in its other end. Lever 461 is maintained on post 462 by a conventional spring clip. A drum actuating pawl 466 is journalled on stud post 463 and maintained thereon by a conventional spring clip. The lever 461 and pawl 466 are so arranged that each time button 458 is pushed inward, pawl 466 will engage a tooth of ratchet wheel 451 and will rotate the ratchet wheel and drum an annular distance equal to the space between two ratchet teeth. Ratchet wheel 451, being provided with ten teeth, this movement will advance the extras drum with ten teeth, this movement will advance the extras drum to the next higher numeral inscribed thereon. To retain the drum 440 in advanced position a ratchet detent pawl 467 is provided at one end of an L-shaped lever 468. The lever 468 is rigidly fastened at its bend to one end of a sleeve 469 journalled on a spacer 470 on the screw 185 held between the two plates 441 and 442. The opposite end of lever 468 is provided with a depending arm 472 having a forwardly directed end lug 473 adapted to cooperate with actuating pawl 466 to prevent actuation by button 458 whenever the meter is in a "home" or "vacant" position. To control the position of lever 468 a dog leg lever 474 extends rearwardly and is rigidly fixed to the opposite end of sleeve 469. On lever 474, adjacent sleeve 469, an apertured ear 475 retains one end of a spring 476 whose other end is fastened on a retaining pin 477 in plate 441. Tension spring 476 will tend to bias the sleeve 469 and the attached detent pawl 467 into engagement with ratchet wheel 451. Thus, whenever actuating pawl 466 is actuated to engage and rotate the ratchet wheel and drum one tooth, the spring biased detent pawl 467 ratchets over and will engage a tooth to prevent reverse rotation of the drum under the action of spring 455.

Clearly shown in Figure 11, the rear end of dog leg lever 474 is positioned in the translatory path of the extended transfer gear shaft 209. Consequently, when the flag is in the "home" or "vacant" position, which places the yoke assembly 210 in its rear position, shaft 209 will engage the end of dog lever 474 and move it clockwise against the action of spring 476. This movement of lever 474 will raise the detent pawl 467 out of engagement with ratchet wheel 451 and simultaneously place end lug 473 of the depending arm 472 into the path of and block movement of the button actuated pawl 466 as shown in Figure 11. Thus, whenever the flag is moved to "home" position, the extras drum detent pawl is released, allowing the drum to rotate back to a starting position under action of spring 455, and manual actuation of the extras drum during the period when the flag is in "home" position is blocked. Note in Figure 11, if shaft 209 is translated to the forward end of the slot, dog leg lever 474 will be spring biased to swing counterclockwise, the detent pawl 467 will be placed in operating coaction with the ratchet wheel and the lug 473 will be removed from a blocking position relative to actuating pawl 466.

Still looking at Figure 11, the totalizing "extras" counter 396 is partially visible behind the front edge of plate 442 and is clamped in the position shown by a friction fit between plates 442 and 441 when long screws 184 are tightened. In this position counter 396 has its gear 480 disposed on the outside of plate 442. Two intermeshing idler gears 481 and 482 are journalled on the exterior side of plate 442 and, in assembled position, mesh respectively with counter gear 480 and the extra drum gear 450. The extra drum gear 450 and counter gear 480 are the same diameter and have the same number of teeth, hence each partial rotation of extra drum 440 will be exactly duplicated on the counter. Each time the extra drum 440 is rotated one-tenth of a revolution, equal to one extra tariff, the counter 396 is rotated one-tenth of a revolution to indicate and record one additional tariff charge. Counter 396, being a unidirectional type, release of ratchet wheel 451 by actuation of the detent pawl 467 will rotate gears 450, 482, 481 and 480 in a reverse direction without affecting the reading on the counter.

*Clock and power driven escapement subassembly*

*Escapement mechanism.*—With reference to Figures 9, 10, 12 and 13, the escapement subassembly 58 is mounted on the rear of base plate 52 by mounting screws 62 and 63, and comprises a framework consisting of a substantially rectangular base plate 490 with vertical posts 491 integrally fixed to the base plate as by staking. The upper ends of posts 491 are provided with threaded studs. Received on the threaded studs and resting on the tops of the posts is a top plane 492. Plate 492 is suitably fastened to the posts and the framework is rigidly held together by nuts 493 engaging the threaded end studs of the posts. The framework provides two parallel spaced plates forming a mounting for various gears, the time escapement mechanism and other mechanisms and enabling a compact controlled escapement mechanism responsive to either a distance traveled condition or to a coordinated distance traveled and time elapsed condition depending on the type of meter operation desired by the taxicab management.

Figure 12:
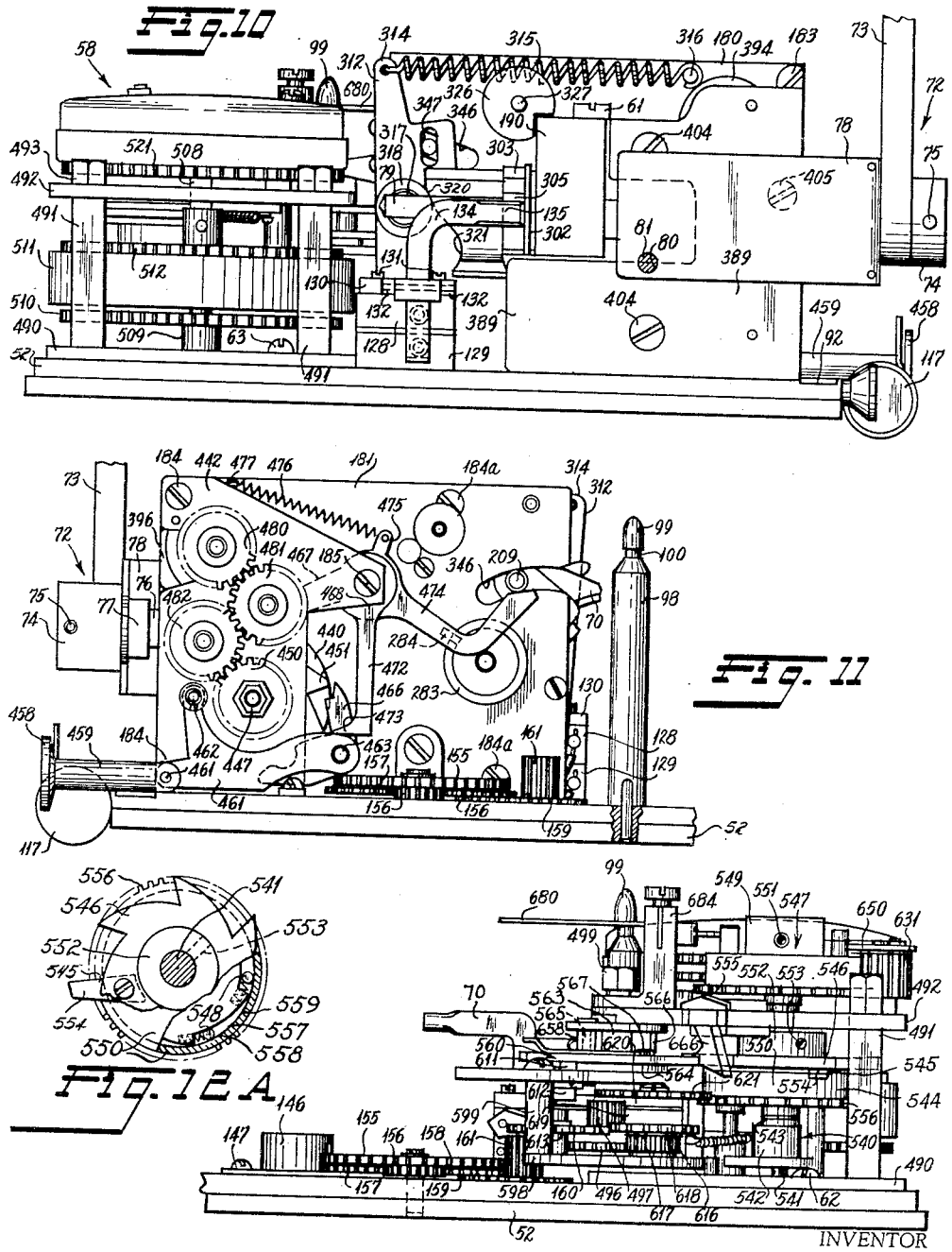
Figure 12 is a broken end view of the meter viewed from the right of Figure 9 with the fare drum subassembly removed.
Figure 13:
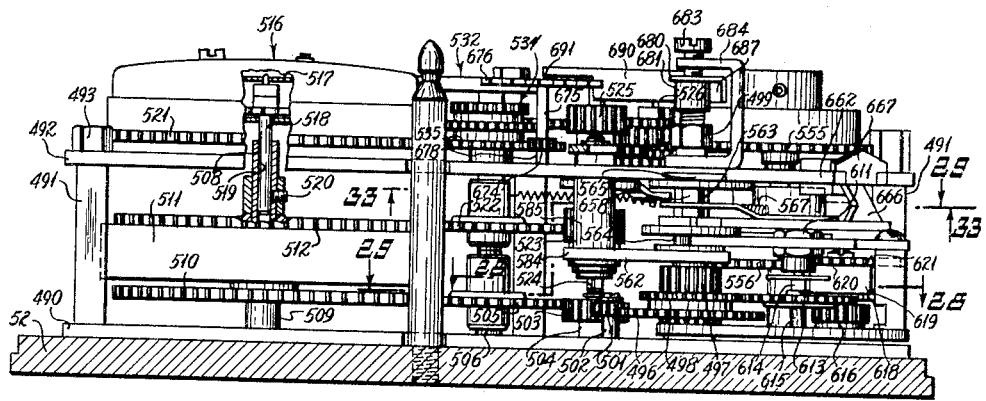
Figure 13 is a vertical sectional view taken on line 13—13 of Figure 9 looking into the front of the escapement subassembly.

Seen in Figures 12, 13 and 29, a gear cluster consisting of a main drive gear 496 and a smaller integral gear 498 splined on a pinion type bushing 497 is journalled on a sleeve surrounding a post 500 fastened as by staking to the bottom plate 490. Gear post 500 extends through and is clamped to the top plate 492 by a nut 499. This post provides a pivot axis for the transfer linkage between the fare drum subassembly and the escapement subassembly controlled by the flag mechanism, and also provides pivotal support for the escapement drop arm and mileage idler shift mechanism, both to be hereinafter described in full. When assembled to the base plate, the escapement subassembly drive gear 496 will intermesh with pinion gear 161 which is continuously rotated whenever the speedometer cable is operating by the vehicle moving in a forward direction, as hereinbefore set forth. The drive gear 496 is coupled to one train of gears including an idler gear 501 (Figures 13 and 29) journaled on stud post 502 fixed to and projecting upward from base plate 490, a second idler gear 503 mounted on a stub-post 504 fixed to the escapement subassembly base plate, and a timer mechanism main spring input idler gear 505 rigidly fixed to an extended shaft 506 journalled in the bottom and top plates. The top end of stub post 504 has a counterbore therein for a purpose to be presently described.

In the left hand portion of Figure 13 a timer main spring drum stud 508 is fixedly mounted to the base plate 490 and extends through the top plate 492. Journalled on the drum stud 508 and spaced from the bottom plate 490 by a collar 509 is a main spring winding gear 510 in meshing engagement with the input idler gear 505. Also journalled on the drum stud 508 and immediately above the input gear 510 is a spring drum 511 having integrally fixed with its upper surface a main spring drive gear 512. At the rear of base plate 490 and adjacent the periphery of the winding gear 510 a detent pawl 513 (Figure 29) is mounted on a stud 514 and is spring biased into engagement with the teeth of winding gear 510 to permit counterclockwise rotation of the input gear and prevent reverse rotation. A conventional slip tail spring similar to that described for the unit fare counter is contained within the drum 511 and arranged to be wound whenever the input gear 510 is rotated in a counterclockwise direction. The spring, being of the slip tail type, cannot be overwound by continuous rotation of the train of gears between the speedometer cable input and the spring drum winding gear 510.

The energy stored in the timer main spring is released at a predetermined rate by a unitary replaceable clockwork escapement mechanism similar to that disclosed in the co-pending application of J. B. McGay et al., Serial No. 243,866 filed August 27, 1951. The clockwork escapement mechanism 516 has its central internal gear 517 fixed to a shaft 518 depending through the escapement casing and received within a counterbore 519 in the upper end of the non-rotatable drum stud shaft 508 and fixed thereto by a collar and set screw 520. In this installation the central gear (Figure 6) of the clockwork remains stationary while the casing, through gearing, is permitted to rotate under the timer spring force at a predetermined rate. Fixed rigidly on the side of the time escapement casing is a large diameter gear 521, which is connected to the time main spring drive gear 512 by a train of gears now to be described.

Referring now to Figure 13, there is freely journalled on shaft 506, above the main spring input idler gear 505, a main spring output idler 522 intermeshed with a pinion gear 523. The pinion gear 523 is fixed by a set screw to a transfer shaft 524 journalled in the counterbore of stub post 504 and extending through and journalled in the top plate 492. Adjacent the top side of plate 492 (Figures 9 and 13) a pinion gear 525 is fastened to the transfer shaft 524 by a set screw (not shown) to rotate as a unit with pinion gear 523. The pinion gear 525 meshes with gear 526 of the gear cluster 527 journalled on a time post 528 extending between the two plates 490 and 492 and above plate 492. In the disclosed arrangement gear 526 meshes with idler gear 530 which is freely journalled on a shaft 531 held in a time change gear sector 532. This post 531 may be positioned at various positions in the sector 532 to engage gear 530 with selected gears of gear clusters 527 and 534 to vary the time rate of the time spring gear movement. To this end, the time change sector 532 is pivoted at 533 on the end of the extended shaft 506 and, as disclosed, is positioned to engage idler gear 530 with gear 526 of the gear cluster 527 and with a second idler gear 535 contained in gear cluster 534 which is rotatably journalled on the extended portion of shaft 506. The time change sector 532 is clamped in the desired angular position by a clamping screw 536. Gear cluster 534 comprises a plurality of integral gears rotatable as a unit and the lower gear 535 intermeshes with gear 521 on the clockwork escapement mechanism. The escapement within the clockwork unit is of the type disclosed in the patent to Nicholson et al. No. 2,562,635 and provides an accurate timing movement to maintain a fixed driving torque within the gear train between the timing mainspring drum 511 and the escapement mechanism 516 regardless of the rate of the drive takeoff utilized to operate the taximeter escapement mechanism.

Gear cluster 527 comprises several gears of different diameters whose axial position on the time post 528 may be varied by shifting the gears and collars between the gears. The sector idler gear 530 and its post 531 may also be shifted on the sector 532 by relocating it in either of the other sector holes 537 and 538 and it may also be repositioned axially in any well-known manner. Thus the idler gear 530 can be made to intermesh with any of the nested gears in cluster 534 at the same time intermeshing with an appropriate gear in the cluster 527. It is thus appreciated that for a constant timed escapement permitted by the escapement gear 521 the rate of rotation of gear 526 may be increased or decreased by adjustment of the time change gear sector.

Thus whenever the speedometer cable is rotating forwardly, gear 496 is also rotated and, through idler gears 501, 503 and 505 will drive gear 510 to wind the time mechanism main spring. The train of gears between the main spring drive gear 512 and the clockwork escapement gear 521 having just been described, it is seen that gear 526 in that train of gears is rotated at a constant rate of speed, determined by the arrangement of sector gear 530, whenever operation of the clockwork escapement mechanism 520 is permitted. If the time between each fare drop is to be cut in half, as will be the case when each drop causes an additional five cent charge rather than a ten cent charge, the entire clockwork unit 516 may be removed by loosening the set screw 520 that fastens the clockwork shaft 518 to the drum stud shaft 508 and an alternate clockwork substituted that will permit a doubled rate of rotation of the train of time driven gears with a resultant equivalent increase of the drop cam escapement rotation. By various means it is possible to obtain any desired rate of drop on the fare drum indicator within reason.

At the right hand side of the escapement subassembly, a drop cam assembly 540 is journalled for rotation about a vertical axis. As shown in Figure 12, the drop cam assembly comprises a shaft 541 journalled in the lower plate 490 and upper plate 492. Disposed on the shaft 541 in consecutive order starting adjacent its lower end are a heart shaped external cam 542 fixedly mounted on shaft 541 as by a set screw, a brass collar 543, and a unidirectional gear drive 544 with a delay release dog 545 and a plural tooth drop cam 546 fixed to the drive casing 550. The shaft 541 passes through upper plate 492 and carries adjacent the top surface a second unidirectional gear drive 547. Both of the unidirectional gear drives consist of a large drive gear freely rotatably mounted on shaft 541 and driving, through ratchet rollers 548 their outer casings 549 (upper) and 550 (lower). The upper drive casing 549 has a reduced boss fastened to shaft 541 as by set screw 551. The drop cam 546 has a central aperture of sufficient internal diameter to receive the boss 552 on the lower unidirectional gear drive casing 550, and a set screw 553 in boss 552 positions and fixes the unidirectional gear drive casing 550, with the drop cam 546 and delay release dog 545, to the shaft 541.

The delay release dog 545 includes an inner portion clamped and held by any suitable means such as the screw in Figure 12A between the drop cam 546 and the casing 550 of the lower unidirectional gear drive. The release dog 545 includes an extended finger 554 for a purpose explained hereinafter. Each of the unidirectional gear drives is arranged to positively drive its casing, hence the shaft and drop cam, whenever the gears are rotated in a clockwise direction; and the casings, shaft and cam, are free to override the gears whenever either of the gears is not driving. With this arrangement, two sources of power may be utilized individually or in conjunction to rotate the drop cam member 546. In this assembly the upper gear drive 547 is connected when desired, through a system to be described later whereby its gear 555 may be driven by the timed rotation of gear 527 to rotate the drop cam 546 at a predetermined rate of rotation. Similarly through gearing, to be described, the lower gear drive 544 has its gear 556 driven at a predetermined rate of rotation by the drive gear 496. Thus, the drop cam can be driven at a rate equivalent to increments of elapsed time or increments of traveled distance or both.

The unidirectional drives are preferably of the spring pressed ball or roller ratchet type as illustrated in Figure 12A, but may be any suitable constant or instantaneous pick-up type of the ball or ratchet and pawl type. The disclosed drive utilizes a drive member 557 integrally attached to the gear 555 or 556 by rivets or their equivalent. The periphery of the drive member is provided with notches or ways 558 having inclined surfaces. Light compression springs 559 are seated within the notches to lightly bias rollers 548 along the inclined surfaces to be wedged between the driving member and the internal cylindrical surface of the casing or driven member 549. This light spring bias serves to assure a continual positive engagement between the driving member 557 and the outer casing or driven member 549 through the rollers and eliminates the lag occurring in most pawl type ratchets and which could occur in straight ball or roller ratchet drives when the drive axis of rotation is vertical.

One of the constant aims of the taximeter industry is to make units and mechanisms of taximeters more compact yet retain the ruggedness and dependability of the larger mechanisms. Consequently, the assembly just described, being a rugged, compact, dual, unidirectional instantaneous drive and drop cam assembly with a very short shaft and having a delay action finger immediately adjacent the drop cam, is considered an important advance over the prior art.

To provide for transfer of the predetermined rate of movement of the drop cam to control the indication of the fare drum counters, an escape lever 560 is provided in cooperative arrangement between the teeth of the drop cam and the pin 284 on the flanged wheel 283 connected to pinion gear 280, and will control incremental release and rotation of the fare spring drum gear 252. The arrangement and cooperation between these various elements is best shown in Figures 28 and 35.

Cooperating with the escape lever 560 and integrally associated therewith is a bell crank lever 562 journalled on the main drive gear shaft 500 immediately above the pinion bushing 497. Integral with the bell crank lever 562 and providing the journal on shaft 500 is a flanged center bearing member 563. An annular groove 564 (Figure 12) is formed between the two lower flanges of the bearing 563 for a purpose to be described. The center and upper flanges provide a support for a pivot pin 565 and a spring post 566. Escape lever 560 is journalled on the pivot pin 565 and biased in a counter-clockwise direction by a tension spring 561 connecting between the lever and the spring post 566. The escape lever 560 is thus pivoted on the flanged center bearing in eccentric relation to post 500, for a purpose to be described. A long arm of the escape lever extends toward the drop cam 546 ending in a dog-leg cam follower 568 adapted to abut the periphery of the drop cam 546. On the opposite side of the pivot point from the dog leg, the escape lever 560 ends in a short arm 569 that cooperates with stop pin 284 on the previously mentioned flanged wheel 283.

The escape lever 560 is made of two parts, shown in Figures 26 and 27. The major part comprising a flat tool steel lever 567 including the pivot bore 570 for engagement with the pivot pin 565. Lever 567 also includes the previously mentioned dog-leg 568 and the short arm 569. The short arm of the lever has a deep notch 571 and a shallow notch 572 formed therein, leaving between them an extended lug 573. The minor part of escape lever 560 consists of a spring steel strip 574 with a notch 575 adjacent one end leaving a flat extended marginal portion 576 at that end. Along the side of strip 574 and adjacent the opposite end, an apertured gear 577 is provided as a spring retainer for the end of spring 561. In the assembled lever 560, the spring strip 574 is riveted through holes 578 and 579 to the tool steel lever 567. The spring strip 574 is sprung in such a manner that the extended end portion 576 maintains a spring biased position spaced above the short arm of the lever 576 a distance approximately equal to twice the thickness of stop pin 284.

Previously mentioned bell crank 562 is integrally joined at its pivot to the flanged center bearing 563. Hence any movement of bell crank 562 will rotate center bearing 563 about the main shaft 500. As escape lever 560 is pivoted at 565 to the flanged collar of bearing 563, any rotation of the bearing will shift the escape lever for a purpose to be described. Integrally fastened in upstanding relation to one of the bell crank arms 584 is a cylindrical bell crank shifter post 585, the top end of which extends through an arcuate slot 586 formed in the top assembly plate 492 and has a reduced diameter end part for receiving the apertured end of connecting link 70 (Figures 9, 12, 34, and 35). Connecting link 70 is maintained in engagement with the shifter post 585 by a conventional spring clip. Integrally fixed to and depending from the other bell crank arm 587 is a second cylindrical post 588 whose purpose will be presently explained.

As best seen in Figure 28 (which is a sectional plan view from below the unidirectional drive), a drop cam reset roller lever 590 is journalled on post 500 and lies flush with the top surface of bottom plate 190. The free end of lever 590 carries a roller stud 591 journalling a roller 592, which is adapted to be biased into engagement with the external surface of the heart shaped cam 542 fixed adjacent the lower end of drop cam shaft 541. The depending post 588 on bell crank arm 587 extends to a point just above the reset lever 590 and bears against the side surface of an upstanding lug 593 integrally formed on the reset lever 590. As shown in Figures 9, 29, and 33, the shifter post 585 is in the position occupied when the meter is set to a "home" or "vacant" position and in this position the depending post 588 has been swung clockwise out of contact with the upstanding lug 593 (Figure 28), thereby allowing reset lever 590 to be biased in a clockwise direction by a spring 594 connected to spring post 595 fixed in lever 590. When the lever 590 is so biased and free from detention by post 588, the roller 592 contacts the heart shaped cam 542 and the cam and shaft 541 together with the drop cam assembly 540 will be reset to the position shown which resets the cam to a predetermined position as will be explained later.

With reference now to Figures 28 and 29, immediately above the reset lever 590 is a mileage gearing carrier plate 598. Fixed to the free end of plate 598 is an upstanding post 599 having a tapped bore at its upper end. Extending to a position adjacent the depending bell crank post 588 and on the opposite side from reset lever lug 593, the carrier plate 598 has an integral finger 600 adapted to be abutted by post 588 when the bell crank lever 562 is in the home position. Coaction between post 588 and finger 600 will force the carrier plate 598 in a clockwise direction. This disengages the mileage drive gears from the lower unidirectional drive gear 556 of the drop cam assembly in a manner to become apparent. The plate 598 carries a spring post 601 providing anchorage for the spring 594 which is connected to the reset roller lever 590, thus simultaneously biasing the carrier plate 598 in a counterclockwise direction and the reset lever 590 in the clockwise direction, i. e., biasing both lever 590 and plate 598 toward the post 588.

A journal stud 602 having a kerfed head 603 is screw threaded into the right hand rear portion of plate 598, Figure 28. The stud 602 provides journalling means for a cluster of idler mileage gears in a drive train now to be described. Spaced above and parallel with the carrier plate 598 a mileage idler shifter plate 604 is provided with a forked end 605 (Figures 30 and 32) journalled in the annular groove 564 provided in the flanged center bearing 563. The outer end of shifter plate 604 rests on top of the carrier plate post 599 and is provided with an arcuate slot 606 through which a screw 607 is threaded into the tapped end of the post 599 to clamp the shifter plate 604 in a predetermined position relative to the carrier plate 598. Passing through the shifter plate 604 in any one of three holes 608, 609, and 610 is an idler gear stud 611 (Figure 28) clamped to the shifter plate 604 by a nut 612. In the disclosed gearing arrangement an idler gear 613 is journalled on stud 611 supported between spacers 614 and 615 (Figure 13) to intermesh with the gear 496 integrally formed on the main drive gear 496. The idler stud 611, gear 613 and spacers 614 and 615 may be rearranged and positioned in shifter plate hole 608 to intermesh with the main drive gear 496 or in hole 610 to mesh with the integral pinion 497 and thereby obtain various speed ratios from the driven gear to the drop cam assembly. The stud 611 does not journal in the lower carrier plate 598 but merely rests on the surface or is spaced slightly above.

Journalled on the carrier stud 602 is a pinion boss 616 having a groove formed adjacent its lower end to receive a spring retainer clip 617 (Figure 12). Freely splined on the teeth of pinion 616 are gear 618 and spacers 619 and 620 retained between clip 617 and a gear 621 force fitted on the upper end of the pinion. Since gears 618 and 621 are splined to pinion 616, the gear cluster rotates as an integral unit. In the arrangement disclosed, gear 618 meshes with and derives its drive through idler gear 613 from gears 496 and 498 and gear 621 of the cluster is adapted to intermesh with and drive the gear wheel 556 of the lower unidirectional gear drive 544. To increase the speed ratio between the gear 496 and the unidirectional gear drive 544, the idler gear 613, stud 611 and spacers 614 and 615 may be rearranged and placed in shifter plate hole 608 and the shifter plate adjusted so idler 613 meshes with main gear 496 and pinion 616. To decrease the speed ratio, the stud 602 is removed and the rear cluster reversed so gear 621 is at the bottom. The stud is replaced in the carrier plate in a second tapped hole whereby the pinion 616 may mesh with gear 556 of the unidirectional gear drive 544. The idler gear 613, spacers and stud 611 are then rearranged and placed in shifter plate hole 610 and the shifter plate adjusted so gear 613 meshes with pinion bushing 497 and with gear 618. It is thus seen that whenever the mileage drive cable rotates, the main drive gear 496 will be rotated and, through the gears carried by the idler carrier plate 598, will also continuously drive gear 621 and its cluster. In Figure 28, a stop pin 622 is fixed in lower plate 490 to limit the counterclockwise movement of the shifter plate 598 and thereby permit proper meshing of gears 621 and 556 and preventing the gear teeth from bottoming. Looking at Figures 28 and 29 which illustrate the positions of the various mechanisms when the meter is set in the "home" or "vacant" position, it will be seen that depending post 588, fixed to the bell crank 562, abuts the finger 600 of the mileage gear carrier plate 598 and forces the plate and idler gears carried thereon in a clockwise direction about shaft 500 against the bias of spring 594. Note in Figure 29, clockwise movement of carrier plate 598 will disengage idler gear 621 from gear 556 of the lower unidirectional drive 544. Consequently, whenever the meter is set in the "home" or "vacant" position, there will be no drive connection from the speedometer cable to the drop cam mechanism, and the meter is rendered inoperative insofar as distance or mileage operation is concerned.

With reference to Figures 9, 33, 34, and 35, the operational function of the shiftable gear drive between the time gear cluster 527 and the upper unidirectional gear drive 547 will be described. Figures 9 and 33 disclose the arrangement of parts when the meter is in the "home" condition, Figure 33 being a view looking up toward the bottom of plate 492. Journalled on the time post 528, immediately adjacent the lower surface of the top assembly plate 492 are two tool steel levers 626 and 627. Lever 626 (high speed) has one arm extended to a point adjacent the shifter post 585 and has a cammed end 628 adapted to engage the cylindrical surface on the shifter post. The other arm of high speed lever 626 extends toward the rear of plate 492 and carries an upstanding journal stud 629 extending through and above an arcuate slot 630 formed in the plate 492. The stud 629 journals an idler pinion 631 in constant mesh with gear 526 of cluster 527 rotated by the time main spring. The post 629 extends beyond the upper surface of pinion 631 and has a slot 632 cut substantially to the post axis in its right hand side (Figure 9) for a purpose to be presently described. Note that pivotal movement of the high speed lever 626 about the post 528 will maintain the pinion gear 631 in mesh with time driven gear 526 and will shift the gear 631 into mesh with gear 555 of the upper unidirectional gear drive 547. A direct drive from gear 526 to gear 555 can thus be realized.

The lever 627 (low speed) includes an arm curved about the transfer shaft 524 and ending in a cam shaped end 636 adapted to engage either the shifter post 585 or the cammed end 628 of the high speed lever. The opposite arm of low speed lever 627 has integrally fixed thereto an upstanding journal stud 637 extending through and above an arcuate slot 638 formed in the upper assembly plate 492. Stud 637 has journalled thereon a unitary gear cluster comprising a large diameter gear 639 (Figures 9, 34, and 35) continuously meshed with the pinion shaped boss 640 of gear cluster 527. On the upper surface of large gear 639 is a small gear 641 adapted to be moved into mesh with gear 555 of the upper unidirectional gear drive 547 upon pivotal movement of lever 627. Since idler gear 639 is constantly meshed with the rotating cluster 527 it will be driven by the time main spring drive and, when lever 627 is shifted so small gear 641 meshes with gear 555, will provide a reduction drive from the time main spring to the drop cam assembly. The two levers, 626 and 627, are connected by a spring 642 fastened to post 643 in the high speed lever 626 and to post 644 in the end of low speed lever 627 so that ends 628 and 636, respectively, of levers 626 and 627 will be biased toward each other. The lever 626 is also biased in a direction tending to move pinion 631 into engagement with gear drive 547 by a spring 645 having one end fastened to the spring post 643 in lever 626 and the other end fasteened to a spring post 646 depending from the lower surface of plate 492.

When the meter is operated to the "home" positioned, shifter post 585 is moved toward the rear end of slot 586 and, as clearly shown in Figure 33, the post will cam between the ends 628 and 636 of the high and low speed levers causing each lever to pivot about post 528 retaining both the pinion gear 631 and the low speed gear 641 out of engagement with gear 555 of the gear drive 547 (note top view Figure 9). Toward the rear edge of the upper plate 492 a high speed gear latching lever 650 is pivoted on an upstanding post 651. Lever 650 lies parallel with the slot 631 cut in post 629 and is biased into engagement with post 629 by a coil spring 652 (Figures 9, 34, and 35) around the post 651. The abutting edge of latch lever 650 has a cutout portion 653 with a squared bottom. With the meter in "home" position and the pinion gear 631 maintained in the position shown in Figure 9, the left side of post 629 will engage the left hand side of the cutout 653 and maintain the lever 650 in the position shown.

Figure 34 discloses the time gears in the position taken immediately after the meter is set to an operative condition. Post 585 has been moved toward the front of slot 586 and away from engagement with both high speed lever end 628 and low speed lever end 636, permitting the high speed lever to rotate in a clockwise direction under the biasing action of springs 642 and 645. As the pinion post 629 moves clockwise about time shaft 528 the slot 632 engages the squared side portion of cutout 653 in the latching lever 650 to latch and prevent further clockwise movement of high speed lever 626. However, since shifter 585 no longer abuts end 636 of the lower speed lever, that lever, under biasing action of spring 642, is permitted to rotate counterclockwise about time post 528 until gear 641 meshes with the unidirectional drive gear 555, thus conditioning the drop cam assembly to be driven from the timer main spring at a low rate of speed. Simultaneously, as previously mentioned, the depending bell crank post 588 has moved away from engagement with finger 600 on the mileage idler carrier plate 593 permitting the spring 594 to shift plate 593 against the stop pin 622 which places the mileage drive gear 621 into engagement with the lower unidirectional gear drive 556.

As will be understood, when the shifter post 585 is moved to an operating position, an initial fare reading will simultaneously appear on the face of the meter. The engagement of the low speed time gear 641 with the drop cam upper gear 555 provides an initial slow time rate of rotation of the gear drive 547 together with the upper casing 549 until the time equivalent to the initial fare has elapsed whereupon an upstanding pin 656 on casing 549 momentarily contacts the end of latch lever 650 to release its latching engagement with the pinion shaft 629 and releases latched lever 626 for swinging movement. Release of the latched lever 626 permits spring 645 to bias lever 626 in a clockwise direction causing cam end 628 to abut the end 636 of the low speed lever and simultaneously move gear 641 out of engagement with gear 555 and move gear 631 into engagement with gear 555. Movement of gear 631 with its post 629 forces lever 650 to the position shown in Figure 35. The initial slow rate of time movement of the drop cam assembly is thus changed to the normal or high rate of time rotation of the upper gear drive 547.

From the foregoing description, it will be clear that when shifter post 585 is positioned to the rear of slot 586 the lower drop cam gear drive 544 and the upper drop cam gear drive 547 are both out of engagement with their respective mileage and time drives and may be freely rotated. Consequently, as shown in Figure 28, with the depending bell crank post 588 in the position shown, the reset lever 590 is biased by spring 594 into engagement with the heart shaped cam 542 and the drop cam assembly, being free to rotate, is rotated to a reset position whereby the lower casing 550, the pawl drop cam 546, the extended finger 554 and the upper casing 549, all integral with the drop cam shaft 541, will be positioned to a starting point as shown in Figure 9. By loosening set screw 551 in the casing 549 of the upper unidirectional drive, the casing and hence pin 656 may be positioned to obtain a desired predetermined time delay before the high speed pinion 631 is unlatched and allowed to engage with gear drive 547. To set the delay finger 554 at a different starting position, the set screw of the heart shaped cam 542 may be loosened to reposition the heart shaped cam.

Reference is now made to Figure 29 which discloses the escape lever construction and cooperative arrangement with the remaining mechanism in the same position disclosed in Figure 9. This figure shows the bell crank 562 rotated to its furthest clockwise position which simultaneously rotates the flanged collar 563 in a clockwise direction. Escape lever 560, as previously mentioned, is pivoted in the flanged collar on a pin 565 and rests on the bottom flange of the collar. Just above the escape lever 560 a spacer 658 (Figure 12) is disposed on pin 565 to maintain the lever against the bottom flange of the collar 563. The portion of lever 560 adjacent the central arbor of the flanged collar 563 includes an abutment 660 for engagement with the arbor, when the collar is rotated clockwise, to shift the entire lever clockwise about the main drive shaft 500. Under this condition spring 561 biases the lever in abutting relation against the arbor surface.

The escapement assembly top plate 492, at its front right hand corner (Figures 9 and 33), is formed with an irregular cutout providing two extending ears 662 and 663. Fitted in jointing relationship within the recessed cutout is a grooved block 664 containing a laterally extending pin 665. Journalled on and hanging from pin 665 is a pendant stop 666 (Figure 12) retained against axial movement on pin 665 by a retaining plate 667 slipped into grooves on the inner edges of fingers 662 and 663. When escape lever 560 is positioned as shown in Figures 9 and 29 pendant stop 666 lies or hangs between the end of dog leg 568 and the drop cam 546 and subsequent counterclockwise movement of bell crank 562 to shift lever 560 counterclockwise will move the tip of the escape lever dog leg 568 to abut against the pendant stop 666, preventing further movement of the escape lever in the counterclockwise direction. Additional counterclockwise movement of bell crank 562 will rotate the escape lever pivot pin 565 counterclockwise and the escape lever will thereby be effectively rotated clockwise against the bias of spring 561. Figure 30 shows the arrangement of escape lever 560 when the bell crank 562 has completed its counterclockwise rotation to the meter operative position. Note in this position that the lever abutment 660 has been repositioned out of contact with the center portion of the flanged bearing 563 to enable subsequent pivotal movement of the lever. Note also the end 569 of lever 560 remains under the stop pin 284 on flanged wheel 283 to prevent rotation of the flanged wheel and the unit fare drum. As previously described, in the meter operative position gear 621 meshes with the gear drive 544 and the time drive also meshes with the upper gear drive 547, consequently, when the drop cam assembly is rotated by either drive means the extended finger 554 adjacent the drop cam 546 will rotate clockwise from its position shown in Figures 9, 29 or 30. Since the finger 554 is below the level of escape lever 560 it will pass under the escape lever during rotation. However, pendant stop 666 lies in the path of the finger 554 and after a predetermined time or mileage driven rotation of the drop cam assembly, which enables a lapse equivalent to the initial fare reading, the finger will contact the pendent stop 666, swinging it away from its position between the escape lever 560 and the drop cam 546, permitting spring 561 to bias escape lever 560 into a position where the end of dog leg 568 engages the camming surface of the drop cam. Simultaneously with this movement of escape lever 560 pin 284 will be released permitting flanged wheel 283 to complete one revolution to record an additional charge on the fare drums and return to the position shown in Figure 31 with pin 284 supported on the end 576 of lever portion 574 thus establishing normal recording operation of the meter. Note in this figure, the short arm 569 of the escape lever has passed out from beneath the stop pin 284 allowing the flanged wheel to rotate 360° until the stop pin contacted the top of end 576 of the spring steel strip 574. The 360° rotation of the flange wheel 283 will result in a ten cent fare drop on the fare drums because of the ratio between gear 230 and drum gear 252. Subsequent rotation of the drop cam assembly will cause the dog leg 568 of the escape lever 560 to ride up on an inclined slope of one of the drop pawl teeth to a point, as shown in Figure 32. At this position the end 576 of the spring strip 574 has moved to the left from under the stop pin 284 permitting the stop pin and wheel 283 to drop a small distance until it again rests on the lug 573 of the escape lever. When the dog leg 568 again drops off of the end of one of the drop pawl teeth, the lug 573 of escape lever 560 is moved from under the stop pin 284 while the end 576 of the spring strip, being spaced sufficiently above the end 569 of the escape lever, will pass over the top of pin 284 again allowing a 360° rotation of the flanged wheel 283 which results in another ten cent fare drop. Every consequent passage of a drop cam tooth past the dog leg 568 will thus result in a predetermined fare drop.

Should a five cent fare drop be desired or required, a long pin extending through or two pins equidistantly spaced around the periphery of flanged wheel 283 will be used. With such a pin arrangement the flanged wheel will be permitted to turn only 180° for each escapement movement of escape lever 560 which will permit the unit fare counter drum to rotate one-tenth of a revolution which, as set up and described, is equivalent to a five cent drop. To assure proper resetting of the meter with the last mentioned pin arrangement, one pin extension is made longer than the other so that when the escape lever is pulled over to "home" position whereby the drop cam assembly is reset as shown in Figures 9 and 29, the flanged wheel escape drum 283 will always stop with the long pin extension resting on the escape lever to thus maintain the original initial fare reading on the unit drum. The initial reading can be either five or zero as desired. Note that a short pin extension 284' (Figure 29) can pass through the notch 572 in the end 569 of lever 560 when the lever is in the position shown.

Figures 31 and 32 indicate the position of dog leg 568, relative to the pendant stop 666, when the escape lever 560 is in operative cooperation with the drop cam 546. In the operative position the dog leg is never moved by the drop cam to a position where the pendant stop 666 can again fall between the dog leg and the drop cam. However, when the meter is positioned in the "home" or "vacant" position, as shown in Figures 9 and 29, during an interval between fares, the dog leg will again be shifted beyond the pendant stop 666 which is enabled to swing into position to prevent immediate return of the escape lever into cooperation with the drop cam.

*Subassembly positioning and time drive stop mechanism*

To facilitate accurate alignment of the escapement subassembly 58 on the base plate 52 so gear 496 will accurately mesh with the drive gear 161 journalled on the base plate, the base end of the main gear shaft 500 is counterbored to fit over previously mentioned locating pin 172 fixed in the base plate 52. The lower and upper escapement assembly plates 490 and 492 are recessed at 669 to embrace the meter cover locking post 98 and the escapement subassembly is fastened to the base plate by screws as previously noted.

To provide a means for controlling time drive of the escapement subassembly, a stop gear 674 (Figures 9 and 13) is provided to mesh with the lowermost gear 535 of the time gear cluster. Gear 674 has an integral hollow shaft 675 fastened at its upper end to a star wheel 676. The gear 674 and hollow shaft 675 are journalled on an upstanding pin 677, Figure 34, having a spacer 678 disposed between the gear and the top plate 492. Best shown in Figures 9, 13 and 36, combined time drive stop and indicator arm 680 is utilized in a novel manner to lock the star wheel 676, thus preventing any rotation of the time gears by the timer main spring, and simultaneously affording a means of indicating timed movement of the gears when the clockwork mechanism is operating. One end of the stop arm 680 is integrally fastened to a brass bushing 681 having fixedly splined within its bore a journal post 682 whose lower end is formed as a conical bearing point. The upper end of insert post 682 has a conical point to be received within the conical recess of an adjustable bearing 683. The stop arm assembly is mounted in a yoke 684 fastened to the top of assembly plate 492 by the nut 499 fastened to the top of the main drive shaft 500. Carried in the base of yoke 684 is a headed journal seat 686 whose head, in the assembled position, seats in a recess formed in the top of plate 492, providing, in conjunction with shaft 500, a means for fixing the position of the yoke on the upper plate 492. The lower end of journal post 682 is seated in the journal seat 686 and, by adjustment of the adjustable journal 683 in the upper end of post 682, is pivotally journalled in yoke 684. Adjacent the bushing 681 the stop arm 680 has an ear 687 bent at right angles and fastened thereto by rivets is a strip of spring metal 690 extending into engagement with the notched periphery of star wheel 676. The end of the spring strip 690 is stepped to provide an extended part 691 overlying the star wheel 676 and preventing axial displacement from its pivot shaft. Rotation of the time gears by the timer main spring will cause the star wheel 676 to rotate in a counterclockwise direction indicated by the arrow (Figure 9) and, if the stop arm 680 is unrestrained, except by a light spring 692, which biases the stop arm assembly counterclockwise with a very light torque, the spring strip 690 will oscillate from tooth to tooth on the star wheel 676 and thereby cause the arm 680 to oscillate in a similar manner. The arm 680 is extended over the shaft 209, passes adjacent the collar member 329 over the square bracing post 186, is bent sharply downwardly and then bent in a reverse direction to pass forwardly between the "units" and "trip" indicators 397 and 398 where its end is bent up to a vertical position and formed as a small rectangular flag member 695 visible through opening 696 (Figure 1) in the front window of the meter casing.

It will be appreciated that during time drive of the gears oscillation of the stop arm 680 will be visible through the window 696 as a lateral reciprocation. When the meter is set to record only mileage the collar 329 is allowed to be spring biased into engagement with the stop arm 680 thus preventing oscillatory movement of the arm and the spring strip 690. Because strip 690 will then be held against the teeth of the star wheel, the star wheel and stop gear 674 are prevented from rotation thereby preventing any rotation of the time driven gears. Note in Figure 15 the radial edge 303 of arbor cam 302 engages the flange 326 and moves it to an extreme position when the flag is in the full down position. Through attachment by rod 327 to the flange 329 the flange and rod are biased against the action of spring 331 away from engagement with the stop arm 680 allowing the time gears to rotate and provides the stop arm with its indicating movement before mentioned.

As shown in Figure 1 when the meter is in the "home" position and in the mileage position and the stop arm 680 is prevented from oscillating, the word "No" will appear in the window 696 to indicate that time is not operating the taximeter. The word "No" is on the rectangular flag member 695 of the stop arm and can be easily read when the stop arm is not oscillating.

*Cover locking*

With respect to Figures 3, 4 and 5 the cover of the meter and the means for locking the cover to the base plate will be described. The cover 54 is fabricated from a piece of sheet metal and comprises two sides, a back and a top with the front side open. The marginal portions of the side plates and top plates that define the front opening are bent over to form a slight lip about the front opening to the extent that lug 82 is provided on one of the sides. Near the front corner on one of the sides a locating pin 698 is welded and projects a slight distance below the bottom plane of the cover. Two angle lugs 699 are spot welded to the bottom surface of the top of the cover and provide guides for piloting and holding a front Plexiglas face plate 700 in its proper position. Prior to assembling the cover on the base plate 52 the Plexiglas face plate 700 may be slid up into the cover between the locating pin 698 and the lips 701 of the front opening and between the depending lugs 699.

When the cover 54 is placed on the base plate 52, as shown in Figure 3, the metallic cover member fits on the shoulder 90 provided on the sides and back of the base plate 52. The face plate 700 rests in the groove 92 along the front of the base plate, and the locating pin 698 fits into the blind hole 96 in the front right hand corner of the base plate. The structural cooperation between the cover 54 and the base plate 52 provides overlapping joints at all points making it impossible for any operator to accomplish petty tampering with the internal works of this meter.

Figure 4:
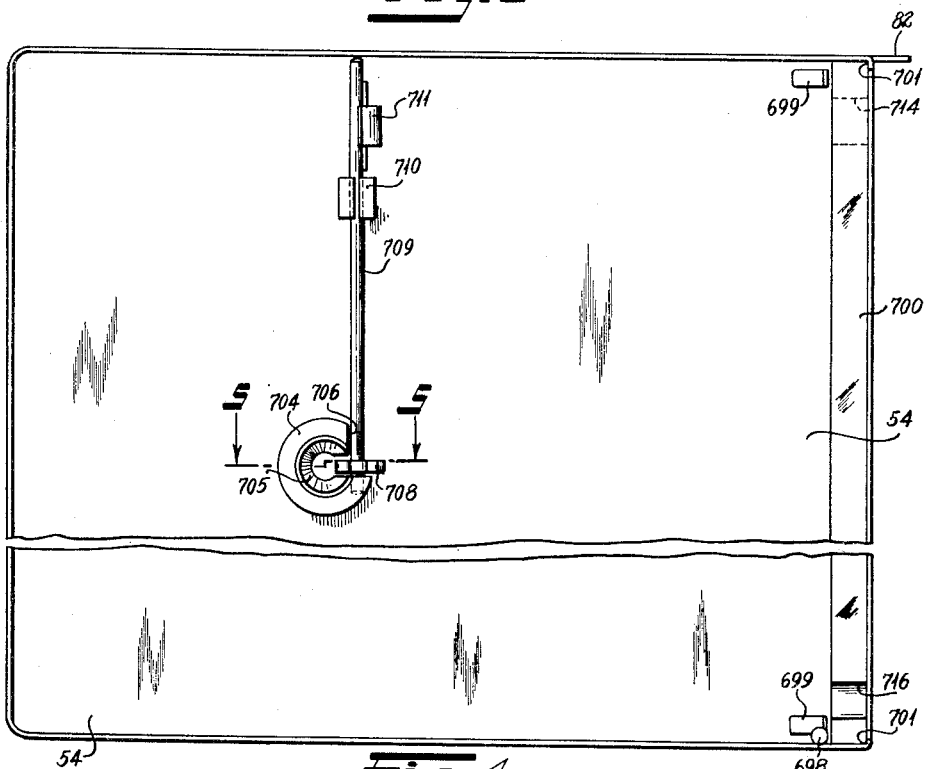
Figure 4 is a plan view of the inside of the meter cover.
Figure 5:
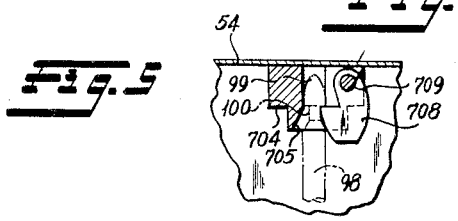
Figure 5 is a sectional view of the cover latch taken on line 5—5 of Figure 4.

The broken section of Figure 3, and Figures 4 and 5 disclose details of the cover latching device that cooperates with the upstanding post 93 in the base plate 52 to retain the cover in assembled relation on the meter as long as the flag shaft 79 is fully inserted. Located on the inner surface of the top of the cover plate is a receptacle 704 having beveled entry edges 705 for receiving the headed end of the locking post 98. A portion of the receptacle 704 is cut away as shown at 706 to provide for pivoting of a latching member 708 and entry of the latching member into the receptacle. The latch member 708 is integrally connected to a rod 709 as by welding. Rod 709 is pivoted at one end in the receptacle 704, is journalled through a square boss 710 and is prevented from axial movement by engagement of its other end with the side wall of cover 54. Pivotal movement of the rod 709 will move the latch member 708 into or out of the receptacle. Adjacent the end of rod 709 opposite latch 708 is welded a depending curved flat metal finger 711, having a slight spring action.

When the two subassemblies 56 and 58 have been mounted in cooperative arrangement on the base plate 52, the cover 54 is placed over the entire assembly. In so doing, the receptacle 704 encircles the headed end of locking post 98, as shown in phantom lines in Figure 5. The flag 72 is then inserted through a hole 714 in the Plexiglas face plate 700. When the flag assembly is fully inserted, the inner end of square shaft 79 (Figure 3) will engage the depending finger 711 of the cover latching device to pivot the rod 709 and latch member 708 into latching position. As seen in Figure 5 the hook on the latch member 708 in the latching position engages under the shoulder 100 of the headed locking post 98 preventing subsequent removal of the cover unless the flag assembly is first removed. With the flag assembly so inserted the screw 81 is then fastened through the cover 54 and retaining plate 78 into block 190 to rigidly secure the flag shaft in place. The sealing wire 84 and seal 85 are then attached through the holes 83 in the retaining plate 78 and lug 82 thus sealing the entire unit against unauthorized access. Note the Plexiglas face plate 700 has a groove 716 cut in its lower edge providing passage for the extra button shaft 459 to the exterior of the meter housing.

Taximeter gear train

In Figure 38 a schematic diagram of the gear train of the meter is disclosed and shows the flow of power from the mileage drive cable input connection throughout the system to the controlled release of the fare drum spring loaded gear 252.

Power is supplied to the meter mechanism through the mileage cable which enters at the bottom of the base plate 52 into square bore 150 of the flanged adapter unit 146 with a theoretical 100.4/17 turns per mile. From this point the power is connected by idler gear 154 to the 118 toothed distance change gear 155. By using gears cut on the 118 tooth pitch diameter but varying the number of teeth from 113 to 123, changes in gear ratio of 5% can be made to accommodate various size vehicle tires, etc. Changes beyond 5% will necessitate changing the cable gear box (not shown) by changing to a 16 or 18 tooth worm gear instead of the standard 17 tooth gear.

Power from the 118 toothed gear 155 flows to the fare drum assembly through integral gear 156, idler gear 157 and the worm shaft pinion gear 292 through a 20 to 1 worm gear drive. Gear 155 in the illustrated meter is designed to make fifteen turns per mile while gear 156 has 20 teeth and pinion gear 292 has 15 teeth. Therefore, the worm shaft will make twenty turns per mile. With a 20 to 1 worm gear reduction into a worm wheel 273 the fare drum main shaft 206 will make one turn per mile winding the fare drum main spring barrel this amount and also registering "total" and "paid" miles on the mileage counters 394 and 395.

Power from the 118 toothed gear 155 also flows through a reduction gear train 158, 159, 160 and 161 to a 60 toothed gear 496 on the support shaft 500 adjacent the fare drum escape lever 560. The reduction train reduces rotation from gear 155 to gear 496 to turn gear 496 one turn per mile. From gear 496 power flows to the right through the mileage idler 498 and change gears 613, 618 and 621, to drive the lower unidirectional drive gear 556 of the drop cam; and to the left, through the train of gears 501, 503 and 505 to drive the clock main spring winding gear 510, the ratio being reduced to one-half turn per mile at the winding gear 510.

Power from the driving end of the clock main spring flows from drive gear 512 through an idler train 522, 523, 525, 526, and either the high speed pinion 631 or the low speed gearing 639, 641 to drive the upper unidirectional drive gear 555 of the drop cam assembly. An idler gear 530 meshes with gear 526 and drives, through a gear cluster 534, to gear 521 of the timer escapement mechanism which serves to control the rate of release of the main spring power to the drop cam.

As previously mentioned the drop cam 546 has six lobes and is in cooperative engagement with an escape lever 560 actuated as previously described to release a pin 284 on the flange 283. Each escapement lever controlled release of the pin 284 allows the 25 toothed pinion 280 to turn either one complete turn or one-half a turn depending on whether the flanged wheel 283 is fitted with one or two pin extensions. Since the drum gear 252 has 125 teeth and gear 280 has 25 teeth, each complete revolution of gear 280, which is connected with flanged wheel 283 will result in a spring powered rotation of the unit fare spring drum one-fifth of a revolution.

It is thus seen that the mileage drive cable accomplishes three primary functions. It winds the fare drum spring, the clock main spring and rotates the drop cam proportionately to elapsed miles. As a secondary function the mileage drive cable also transmits power to record total miles elapsed and paid miles elapsed on the "total" and "paid" miles counters.

Wiring circuit

Figure 37 shows the wiring circuit incorporated in the taximeter and used for controlling conventional taxicab indication lights for visually indicating the meter condition, to company inspectors.

In the disclosed arrangement, the terminal plate 112 mounted in the meter base plate has four terminal connections, 720 to be connected to the electric power supply (not shown) of the taxicab, 721 to be connected to a device (not shown) indicating the taxicab is "Vacant," i. e., the meter is not operating, 722 to be connected to a device (not shown) indicating the taxicab is hired but time is not being recorded, and 723 to be connected to a device (not shown) for indicating the taxicab is hired and the meter is set to a time recording position. The circuits are for use in a single line electrical system using the vehicle frame as the ground line.

The power terminal contact is connected by a line 724 to one clip 124 of the push pull switch controlled by button 122. The second clip 125 of the switch connects by circuit 725 to the movable contact of the lower micro-switch 129. As previously mentioned both micro-switches are single pole double throw springs biased to one of the positions. In the spring biased position of both switches, the lower switch 129 completes a circuit through jumper wire 726 to and through the movable contact of the upper micro-switch 128, and through line 727 to the terminal contact 721 for indicating the "Vacant" condition.

When the upper micro-switch 128 is operated against the spring bias a circuit will be completed from its movable contact through line 728 to the terminal contact 722 for indicating a "hired-no time recording" condition. When the lower micro-switch 129 is operated against the spring bias the circuit from the movable contact through jumper wire 726 to the movable contact of the upper micro-switch 128 will be broken and a circuit will be made through line 729 to the terminal contact 723 for indicating a "hired-time recording" condition.

Each micro-switch is operated by a push pin partially extending out the front of the switch and adapted to be engaged and pushed against the switch spring bias by the cam operated lever 134. The circuit is arranged so one indicating device is operative when both micro-switches are in their spring biased position (as shown), a second device is operative when the first micro-switch is operated by pushing pin 730, and a third device is operative when the second micro-switch is operated by pushing pin 731. In the arrangement of one micro-switch 128 on top of the other micro-switch 129 (Figures 14 and 15), the pin 730 of the top switch will be pushed in by initial movement of lever 134 and pin 731 of the bottom switch will be pushed in by subsequent movement of lever 134, because pin 730 is closer to the pivot of the lever and therefore requires less lever movement for operation than does pin 731.

Movement of lever 134 from a position where neither micro-switch is operated (Figures 14 and 37) to positions where the top switch is operated and thence to a position where both switches are operated (Figure 15), is provided by action of the cam follower end 135 of lever 134 coacting with the radial camming portion 305 of cam arbor 301.

With the flag 73 in a vertical position (0 degrees) the lever cam follower end 135 is on the lowest cam dwell, enabling both micro-switches to be biased to the position shown in Figure 37. Thus the circuit to the "Vacant" indicating device is completed when the flag is vertical. When the flag is inclined (45 degrees) the lever cam follower end 135 is on an intermediate cam dwell which will pivot the lever a sufficient distance to operate only the top micro-switch. This flag position, as previously described, prevents the timer from operating the meter but enables the meter to operate on mileage and the corresponding circuit is completed to the "hired-no time recording" indicating device. When the flag is horizontal, the lever cam follower end 135 is on the highest cam dwell causing the lever to pivot sufficient to operate both micro-switches and indicate the corresponding meter condition of "hired-time recording."

Also connected to the push-pull switch clip 125 is a line 732 to the power terminal clip 115 of the meter lamp unit. All electric power to the meter is controlled by the push pull switches 123, 124, 125. Note that the circuit, although controlled by the meter flag and used to operate devices for indicating the meter condition, does not effect the meter operation.

*Taximeter mounting structure*

Although the meter may be mounted in any of a plurality of locations, as previously mentioned, its small size adapts it readily for mounting in a position over the dashboard of the taxicab as illustrated in Figures 39 and 40. Prior art meters, if mounted over the dashboard, due to their large size would objectionably obstruct the view of the driver and not be acceptable in practice. The present meter being no larger than an average size cigar box would impose no obstruction in the line of view of the driver since the projection of the meter outline lies with the confines of the visional obstruction offered by the hood and fenderline of the vehicle. In addition the location is away from normal storage and passenger space, enables both driver and passenger(s) to have an excellent view of the meter face, provides excellent visibility of the flag position from exterior as well as interior to aid company inspectors to check proper meter usage and is mounted to the dashboard with a minimum of drilling hidden behind the dash.

As illustrated, a simple structure for mounting this taximeter in the above mentioned preferred position consists of an adapter 740 bolted to the forward mounting holes in the meter base plate and incorporating a cable end fitting that fits into the drive adapter of the input gearing and an electric contact plug cooperating with the electric contacts on the dielectric disc in the base plate. Parallel tubes 742 and 744, are fitted in sockets in the upper adapter 740 and retained by set screws 746. The lower ends of the tubes cooperate with a lower adapter 748, resting in sockets and retained by set screws 750 in the same manner as the upper ends of the tubes. Although two tubes are disclosed it will be appreciated that one or more tubes will serve the same purpose. Lower adapter 748 is fastened to the lower flange 752 of the dashboard by a plurality of bolts 754. The mileage drive cable 756 passes, from under the dashboard, through one tube to the upper adapter where its end fitting is maintained in driving relation with the meter, and the electric wires from the taxicab power and indicating devices pass through the second one of the tubes to the upper adapter.

Fastened to the rear of the meter base plate through the rear mounting holes are several rubber pads or feet 758 bearing against the top of the dashboard in close proximity to the windshield 759 to provide extra support and prevent vibration of the meter.

As disclosed in Figure 41, the rubber pads 758 have a recessed hole 760 providing passage for the mounting bolts (not shown). As an added measure to ensure rigidity of the mounting structure high strength permanent magnets 762 may be vulcanized in the bottom of the rubber pads 758 to magnetically clamp the pads against the metal dashboard.

Clearly shown in Figure 40, the front of the lower adapter 748 has a depending front plate 764 to blend with the dashboard design and to hide the cable and wiring that enter the lower ends of the support tubes.

It will be appreciated that my invention comprises a small, compact lightweight taximeter that can be economically manufactured and maintained because of the use of separable subassemblies that can be easily removed and replaced. The assembly cannot be entered without breaking a seal and to that extent is tamperproof. By a novel cover latching device the inside of the meter is readily accessible for repairs.

Standard auxiliary indicators are incorporated to indicate extras, and totalize extras, trips, units of fare drops, paid miles traveled and total miles traveled, and all indicators including the fare are visible on the front face of the meter.

The sole input power to operate the fare and mileage indicators is from a mileage cable drive. Because the mileage cable drive does not directly drive the fare drums, but is only utilized to wind two springs, the strain on the drive cable is relatively light and substantially constant, minimizing cable breakage which is prevalent in prior art meters using the mileage cable drive to rotate the drop cam.

A novel interlocking arrangement is incorporated in the fare drum reset mechanism to prevent return of the flag arm to a meter operative condition until all fare drums are reset to their initial fare indication.

The fare drum control mechanism is so arranged to provide a novel initial delay in operation of the meter equivalent to the initial fare indication, and this delay can be either proportional to time or mileage or both. Furthermore different mileage and time rates of operation are available by merely rearranging various gear clusters within the meter assembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a taximeter having flag controlled operative and inoperative registering conditions, fare indicating means, means connecting with said fare indicating means for storing power to operate said fare indicating means, escapement means coacting with said fare indicating means to enable controlled intermittent releasing of power to said fare indicating means, time responsive drive means and mileage responsive drive means adapted to operate said escapement means during a meter operative condition, and power input gear means connected to and operative to furnish power to said power storing means during taximeter operative and inoperative registering conditions and to both of said time and mileage responsive drive means.

2. A taximeter as set forth in claim 1, wherein said time responsive drive means comprises a train of shiftable idler gears whereby operation of said escapement means at different time increments may be effected by changing the arrangement of the idler gears.

3. A taximeter as set forth in claim 1, wherein said mileage responsive drive means comprises a train of idler gears whereby operation of said escapement means at different mileage increments may be effected by changing the arrangement of the idler gears.

4. A taximeter as set forth in claim 1, wherein said time and mileage responsive drive means comprises two separate trains of idler gears whereby operation of said escapement means at different time increments may be effected by altering the arrangement of the idler gears within one set and operation of said escapement means at different mileage increments may be effected by altering the arrangement of the idler gears within the other set.

5. In a register, the provision of support means, a set of rotatable registering wheels carried by said support means and comprising one wheel for each order of a multi-order group, means inter-relating all wheels for registering transfer operation, a power storage coil spring means forming the sole driving connection to the lower order wheel and adapted to slippingly drivingly cooperate with said lower order wheel and slip only when said power storage spring is wound beyond a predetermined torque value, an escapement mechanism adapted to be actuated independently of said coil spring means structurally cooperating with said lower order wheel to normally prevent its registering rotation and when actuated to permit a predetermined registering rotation of said lower order wheel under action of said power storage spring, and means for winding said power storage spring independently of said escapement mechanism actuation.

6. In a taximeter having a fare drum assembly including a self contained power storage means to rotate said drums; an escapement assembly exterior of said fare drum assembly comprising an escapement cam, a plurality of input drives for said escapement cam, an escapement lever intermittently actuated by said escapement cam and structurally cooperating with said fare drum assembly to permit a controlled increment of operation by said power storage means for each intermittent actuation, a plurality of power means, responsive to different conditions, connected to the plurality of input drives for said escapement cam to operate said escapement cam in accordance with said different conditions, and means responsive to one of said different conditions for storing power in said power storage means independently of said plurality of input drives for said escapement cam.

7. In a taximeter, a fare registering assembly comprising register drums structurally inter-related to indicate progressive value increases in total fare, said assembly including a means for storing driving power interconnected with said registering assembly to impart drive power tending to increase the total fare indication, means including a pivoted lever cooperating with said registering assembly to permit a predetermined value recording rotation of said registering assembly under power of said stored driving power at increments proportional to an elapsed condition of time and/or distance, and means responsive to elapsed conditions of distance and bypassing said means including said pivoted lever for adding energy to said power storage means.

8. A taximeter comprising fare registering indicators, a power storage drive means for driving said indicators, means responsive to mileage travelled and/or time elapsed for intermittently releasing said power storage drive means for operation, and means, independent of said means responsive to mileage travelled and/or time elapsed, responsive to mileage travelled connected to furnish power to said power storage drive means.

9. A taximeter as set forth in claim 8, wherein said means for intermittently releasing said power storage drive means includes, an escapement lever cooperating with the indicators to intermittently permit a predetermined rotation of said indicators by said power storage drive means, a spring driven clockwork and a mileage indicative gear train both connected to actuate said lever.

10. A taximeter as set forth in claim 9, together with independent gear trains connected to said mileage indicative gear train for automatically winding the spring of the spring driven clockwork and storing power in said power storage drive means.

11. A taximeter comprising a set of fare registering drums, a drum shaft rotatably mounting all of said fare drums, a mileage drive input gear train connected to rotate said drum shaft, a power storage device connected between said drum shaft and one of said drums for storing power obtained from rotation of said drum shaft, and control means for intermittently permitting a predetermined rotation of said drums under power from said power storage device in response to a predetermined rotation of said mileage drive input gear train.

12. A taximeter as set forth in claim 11, wherein a total mileage counter is connected to be driven by said drum shaft.

13. A taximeter comprising a set of fare registering drums, a drum shaft rotatably mounting all of said fare drums, a mileage drive input gear train connected to rotate said drum shaft, a power storage device connected between said drum shaft and one of said drums for storing power obtained from rotation of said drum shaft, control means adapted to cooperate with said one drum for intermittently permitting a predetermined rotation of said drums under power from said power storage device in response to a predetermined rotation of said mileage drive input gear train, and means structurally inter-related with said set of drums and said control means and positionable to disenable and enable said control means and to reset said set of drums when said control means is disenabled.

14. A taximeter as set forth in claim 13 including a mileage counter continuously connected to said drum shaft and a paid mileage counter adapted to be connected to said drum shaft when said structurally inter-related means is positioned to enable operation of said meter by said control means.

15. A taximeter as set forth in claim 13, wherein the power storage device comprises a slip tail spring connected at one end to be wound by said drum shaft and at the other end to said one drum to slip after being wound to a predetermined torque value.

16. A taximeter having fare registering means, self-contained drive means for said registering means, escapement means including a device responsive to elapsed mileage and time conditions and actuated independently of said drive means for releasing said drive means to effect predetermined registering actuation of the fare registering means, and means selectively cooperable with said escapement means and the registering means adapting said taximeter to utilize a selected fare drop rate of a plurality of fare drop rates to establish a predetermined registering actuation.

17. A taximeter as set forth in claim 16 wherein said plurality of fare drop rates include at least two drop rates one of which is twice the value of the other.

18. A taximeter as set forth in claim 16, wherein said fare registering means comprises a plurality of register drums, the lowest order drum containing a torque storage spring operable to rotate the drums in a fare indicating direction, said escapement means includes an intermittently oscillated, pivoted escapement lever and the means between the escapement means and the registering means includes a shaft rotatably connected with said one drum adjacent said lever and having at least one stop pin extending therefrom and adapted to coact with said lever and allow a predetermined rotation of said one drum each time the lever makes a complete oscillation.

19. In a taximeter having a fare registering assembly, the improvement comprising a registering assembly contained source of register actuating power, a drop cam, a register escapement lever actuated by said drop cam, a power means including a clock type mainspring adapted to rotate said drop cam at selected speeds, and a time escapement mechanism connected with said mainspring and adapted to control the release of mainspring energy at a constant torque rate to drive the drop cam at accurate selected speeds of rotation.

20. A taximeter as set forth in claim 19 wherein said power means includes a variable speed transmission to rotate said drop cam and said time escapement mechanism comprises an independent removable assembly having means for interconnecting said clock type mainspring and said variable speed transmission whereby selected speeds of rotation of the drop cam can be obtained merely by use of a suitable time escapement mechanism.

21. A taximeter comprising: fare registering means; means to operate said fare registering means; means responsive to elapsed time and/or mileage adapted to coact with and control said operating means; a manual taximeter control means having a three position flag movable back and forth in a limited arc about a pivotal axis to provide the registering means with an inoperative condition, a mileage responsive registering condition, and a mileage and time responsive registering condition; a time registering condition indicator element operative in response to movement of said flag to a position providing a mileage registering condition to indicate that time is not being recorded and when said flag is pivoted to a position providing a mileage and time registering condition to oscillate and visually indicate that the taximeter is conditioned to register in response to elapsed time and mileage.

22. A taximeter having a manual control and a power input gear train, comprising: a base plate rotatably carrying said input gear train; a fare drum and indicating subassembly providing means to mount said manual control; a coordinated mileage and time governed escapement subassembly; means independently removably mounting each complete subassembly on said base plate; means interrelating said two subassemblies whereby said power input gear train independently furnishes drive power to each subassembly, the escapement output being structurally related to coact with said fare drum assembly to control the fare drum registration; and means structurally associating said manual control with the two subassemblies for simultaneously rendering both subassemblies operative or inoperative, by said manual control.

23. In a taximeter, a frame structure, a fare drum shaft rotatably mounted in said structure, a plurality of fare drums mounted on said shaft, power means to impart rotative force to one of said drums, means external of said fare drums interrelating said fare drums for registering actuation including a movable carrier having transfer gear means shiftable into and out of registering engagement with said fare drums, manual means rendering said taximeter operative or inoperative and interconnecting with said carrier external of said fare drums to translate said gear means into engagement when said meter is in an operative position and to translate said gear means out of engagement when said meter is in an inoperative position and means structurally related to each drum and to said carrier to reset all of said drums to an initial value upon shifting of said transfer gears out of engagement.

24. A taximeter as defined in claim 23 further including a movable flasher plate shiftable to cover and uncover the registered amount on said fare drums and mechanically coupled with said carrier to uncover the registered amount on said fare drums when the carrier is moved to a position where the transfer gears are in engagement and to cover the registered amount on said fare drums when the carrier is moved to a position where the transfer gears are out of engagement.

25. In a taximeter: a frame structure; a fare drum shaft rotatably mounted in said structure; a plurality of fare drums mounted on said shaft; power means to impart rotative force to one of said drums; means interrelating said other fare drums with said one drum for registering actuation including transfer gear means shiftable into and out of registering engagement with said fare drums; condition responsive escapement means operatively engaged with said one drum to release the power means to drive said one drum; escapement control means for rendering said escapement means operable or inoperable to release said power means connected with and operable by said transfer gear means whereby said escapement means is operable to release the power to drive said one drum when the transfer gears are in engagement, and is effective to arrest the driving action of said power means when said one drum arrives at an initial fare indicating value with said transfer gears disengaged; manual means rendering said taximeter operative or inoperative and interconnecting with said transfer gear means to translate said gear means into engagement when said meter is in an operative position and to translate said gear means out of engagement when said meter is in an inoperative position; means structurally related to each drum and to said transfer gear means to reset all of said drums to an initial value upon shifting of said transfer gears out of engagement; and a movable flasher plate mechanically coupled with said transfer gear means and operable to uncover the registered amount on said fare drums when the transfer gears are in engagement and to cover the registered amount on said fare drums when the transfer gears are out of engagement.

26. In a taximeter, a frame structure, a fare drum shaft rotatably mounted in said structure, a plurality of fare drums mounted on said shaft, power means to impart rotative force to one of said drums, means external of said fare drums interrelating said fare drums for registering actuation including a movable carrier having transfer gear means shiftable into and out of registering engagement with said fare drums, manual means rendering said taximeter operative or inoperative and interconnecting with said carrier external of said fare drums to translate said gear means into engagement when said meter is in an operative position and to translate said gear means out of engagement when said meter is in an inoperative position and a movable flasher plate shiftable to cover and uncover the registered amount on said fare drums and mechanically coupled with said carrier to uncover the registered amount on said fare drums when the carrier is moved to a position where the transfer gears are in engagement and to cover the registered amount on said fare drums when the carrier is moved to a position where the transfer gears are out of engagement.

27. In a taximeter, a frame structure, a fare drum shaft mounted in said structure, a plurality of fare drums mounted on said shaft, power means to impart rotative force to one of said drums, means interrelating said fare drums for registering actuation including transfer gear means shiftable into and out of registering engagement, manual means rendering said taximeter operative or inoperative and interconnecting with said transfer gear means to translate said gear means into engagement when said meter is in an operative position and to translate said gear means out of engagement when said meter is in an inoperative position, a movable flasher plate, including a gear segment resolved on a circular arc about the axis of said drum, shiftable to cover and uncover the registered amount on said fare drums and engaged with said transfer gear means to uncover the registered amount on said fare drums when the transfer gears are in engagement and to cover the registered amount on said fare drums when the transfer gears are out of engagement, and a unit counter for totalizing the number of actuations of said meter to fare indicating position, said unit counter being the unidirectional type having a gear actuator extending from one end and said unit counter being mounted in said frame with the axis of said gear parallel to said drum axis and with the gear in mesh with the arcuate gear segment of said flasher plate, whereby each actuation of said flasher plate to a fare manifestation indication position will add one count to said unit counter.

28. In a taximeter, a frame structure, a fare drum shaft rotatably mounted in said structure, a plurality of fare drums coaxially mounted on said shaft, power means to impart rotative force to one of said drums, means interrelating said fare drums for registering actuation including transfer gear means shiftable into and out of registering engagement, manual means rendering said taximeter operative or inoperative and interconnecting with said transfer gear means to translate said gear means into engagement when said meter is in an operative position and to translate said gear means out of engagement when said meter is in an inoperative position, a drum boss fixedly carrying a coaxial gear provided at one side of said fare drums, a movable flasher plate having two side arms, one pivoted on said drum boss and the other pivoted on said drum shaft on the other side of said fare drums from said drum boss, said flasher plate being shiftable to cover and uncover the registered amount on said fare drums and engaged with said transfer gear means to uncover the registered amount on said fare drums when the transfer gears are in engagement and to cover the registered amount on said fare drums when the transfer gears are out of engagement, idler gear means disposed on said one side arm and intermeshed with said drum gear, and a unitary counter provided in said frame having a drive gear positioned to be engaged by said idler gears when said flasher plate is positioned in a fare manifestation disposed position whereby each added increment of fare rate will be counted as one unit on said unitary counter.

29. A taximeter as set forth in claim 28 wherein said drum shaft rotation is indicative of elapsed miles, a gear is rigidly connected to said shaft adjacent the flasher arm which is journalled about said shaft, said shaft journalled flasher arm has disposed thereon idler gear means meshing with said drum shaft gear, and a unitary counter is provided in said frame having its drive gear positioned to be engaged by said idler gear means that mesh with said drum shaft gear whenever said flasher plate is moved to a position whereby said fare drum manifestations are visible through said aperture, whereby said unitary counter is rotatably engaged to the drum shaft gear and will record the total of paid miles.

30. In a taximeter: a frame structure; a fare drum shaft rotatably mounted in said structure; a plurality of fare drums rotatably mounted on said shaft; power means to impart rotative force to one of said drums; means interrelating said fare drums for registering actuation including transfer gear means shiftable into and out of registering engagement; manual means rendering said taximeter operative or inoperative and interconnecting with said transfer gear means to translate said gear means into engagement when said meter is in an operative position and to translate said gear means out of engagement when said meter is in an inoperative position; and means structurally related to each drum and to said transfer gear means to reset all of said drums to an initial value upon shifting of said transfer gears out of engagement, including a coaxial internal heart shaped cam fixed to each fare drum except said one drum, and a cam actuator assembly having individual cam actuators adapted to coact with each heart cam.

31. A taximeter as in claim 30, wherein said means structurally related to each drum and to said manual means to reset all of said drum to an initial value, further includes spring biased means engaging said cam actuator assembly and adapted to assure operation of said cam assembly sequentially after said transfer gears are translated into or out of engagement to respectively move the cam actuator assembly away from coaction with and into coaction with said heart shaped cams.

32. A taximeter as in claim 30, wherein said means structurally related to each drum and to said manual means to reset all of said drums to an initial value, further includes a wheel rotatively engaged with and rotated by said one drum, a radially extending pin in the periphery of said wheel and a lever pivotally positioned adjacent said wheel to enable said pin to strike said lever and prevent rotation of said wheel and said one drum past a predetermined indication on said one drum whenever said transfer gears are shifted out of counting engagement.

33. A taximeter comprising: a frame, a plurality of fare registering wheels mounted for rotation about a common axis in said frame, corresponding to the respective orders of a multi-order denomination, and having value manifestations on their peripheries; means for transferring value manifestations from a lower order wheel to a next higher order wheel each time a lower order wheel reaches a predetermined manifestation, including a transfer pinion yoke assembly disposed to pivot about an axis parallel to said wheel axis and including a shaft, a plurality of transfer pinions rotatably disposed on said shaft, and a member extending from said yoke; a flasher plate mounted to pivot about said wheel axis, positionable in one position to uncover the fare indicating manifestations on said wheels and in a second position to cover said fare indicating manifestations on said wheels; means comprising a flag assembly, an arbor including a cam rotatable by said flag assembly, a lever pivoted on said frame and coacting with said cam and with said transfer pinion shaft whereby rotation of said cam by said flag assembly will cause said lever to pivot said yoke assembly about its axis to either of two positions to translate said pinion transfer shaft and gears into or out of registering engagement with said fare wheels; and means interconnecting said flasher plate and said member extending from said yoke whereby pivotal movement of said yoke to one of its positions will place said flasher plate in one of its positions and pivotal movement of said yoke to its other position will place the flasher plate in its other position.

34. A taximeter comprising a fare drum subassembly including a first support means, operating power storage means disposed on said support means and a plurality of fare drums disposed on said support means, a time rate operated drum escapement subassembly including a second support means with time delay means disposed thereon, a plural position manual control means, said subassemblies including means structurally interconnecting said manual means and said two subassemblies operable upon positioning said manual means in one position to enable said drum escapement subassembly after a predetermined time delay to control registration of accumulative increments of fare on the fare drums starting from an initial fare drum registration and operable upon positioning of said manual means in a second position to reset said fare drums to said initial fare drum value registration and to reset said drum escapement subassembly to again provide said time delay when the manual means is again moved to said one position.

35. A taximeter as set forth in claim 34 wherein said drum escapement subassembly comprises a rotatable drop cam having a predetermined angular position corresponding to the reset position on said drum fare drums and the means for resetting said escapement subassembly comprises a pivoted lever released upon actuation of said manual control means and having a roller pivotally mounted on one end, and an external heart shaped cam fixed to said drop cam assembly and arranged to be engaged and actuated by said roller, whenever said manual means is put in said second position, to reset said drop cam to said predetermined position.

36. A taximeter as set forth in claim 34 wherein said drum escapement subassembly comprises a rotatable drop cam having a plurality of cam surfaces about its periphery, a drop cam follower pivotally arranged in said drum escapement subassembly to coact with said fare drum subassembly to permit one increment of increase in fare registration each time said drop cam rotates one of its cam surfaces past said drop cam follower, a plurality of drive means connected to said drop cam, one of said drive means including a clockwork connected to one of said drive means, another of said drive means including a mileage drive gear train connected to another of said drive means, and a reset means in said drum escapement subassembly adapted to rotate said drop cam to said predetermined position, and movement of said manual means to said second position effects such drop cam rotation and also removes said drop cam follower from contact with said drop cam and disconnects the connections to the drop cam drive means.

37. A taximeter comprising: a frame structure; a plurality of fare wheels mounted for rotation about a common axis in said frame and corresponding to the respective orders a multi-order denomination and having value manifestations on their peripheries; means for transferring value manifestation from a lower order wheel to a next higher order wheel each time a lower order wheel reaches a predetermined manifestation including a transfer pinion yoke assembly disposed to pivot about an axis parallel to and offset from said wheel axis and having a transfer pinion shaft and a plurality of transfer pinions rotatably disposed on said shaft; means for manually pivoting said yoke assembly about its axis to either of two positions whereby said pinion transfer shaft and gears are translated into or out of registering engagement with said fare wheels; an extras fare wheel rotatably disposed at one side of said plurality of fare wheels provided with manifestations of extra fares; means for advancing said extras fare wheel unit by unit including spring means biasing said extras drum to an initial zero reading and a locking pawl for permitting advance rotation of said extras fare wheel and preventing reverse rotation under spring action; an extension on said pinion transfer shaft extended beyond said yoke; an arm rigidly fixed to said extras fare wheel locking pawl having a cam portion in the path of movement of the pinion transfer shaft extension and adapted to be engaged and moved by said pinion transfer shaft extension when said yoke assembly is shifted to disengage said transfer pinions from said fare wheels and thereby release said locking pawl to permit reverse rotation of said extras fare wheel by said spring means to an initial reading.

38. A taximeter as set forth in claim 37 wherein said extras fare wheel locking pawl is provided with a further arm movable, by releasing said locking pawl, into a position blocking the movement of said extras fare wheel advancing means.

39. In a taximeter having counting fare registering means with multi-order indicating devices and transfer means shiftable into and out of engagement with said devices, reset means connecting and operable by shifting of said transfer means to reset said indicating devices to a predetermined fare registration and flag operated means coacting with said shiftable transfer means for shifting the transfer means; the improvement comprising latching means adapted by the shifting of said transfer means out of engagement with said indicating devices to engage said flag operated means to prevent flag operation to shift said transfer means back into engagement with said indicating devices, and means structurally interrelated with said reset means and operatively engageable with said latching means, adapted by a complete resetting of said indicating devices to render said latching means inoperative.

40. A taximeter as set forth in claim 39 wherein said flag operated means comprises a rotatable flag shaft carrying a cam having an axial camming portion, said transfer means includes a pivoted lever and resilient means biasing the lever into engagement with said camming portion whereby rotation of said flag shaft in one direction will move said lever about its pivot against the biasing action to shift said transfer means out of engagement and rotation of the flag shaft in the opposite direction will permit resiliently biased movement of said transfer means into engagement.

41. A taximeter as set forth in claim 39 wherein said flag operated means comprises a rotatable element having a segment of cylindrical surface provided with a notch and said latching means comprises a pivoted pawl adapted to pivot into said notch when said flag operated means is operated to shift said transfer means out of engagement with the indicating devices, to thereby block operation of said flag operated means to shift said transfer means into engagement.

42. A taximeter as set forth in claim 41 wherein said latching means further comprises a weighted pivoted lever engaging said pivoted pawl to move said pawl toward said cylindrical surface by gravity action of the weighted lever about its pivot and to move and retain said pawl away from said cylindrical surface when said weighted lever is blocked from pivoted movement due to gravity; said means structurally interrelated with said reset means being adapted to block said weighted pivoted lever when said indicating devices are out of the reset position.

43. A taximeter comprising: a frame structure, a plurality of fare wheels mounted for rotation in said frame; means for transferring the count between wheels shiftable between a counting engagement position with said wheels and a position wherein the transfer means are disengaged from said wheels; flag operated means rotatable about an axis; means interengaged between the count transfer means and said flag operated means whereby one angular position of the flag operated means operates to maintain said count transfer means out of engagement and the remaining plurality of positions enables said count transfer means to engage the fare wheels; power means to rotate said fare wheels; control means independent of said power means responsive to time lapse and mileage lapse for blocking and unblocking rotation of said fare wheels and thereby intermittently permitting actuation of said wheels by said power means; means interengaging said flag operated means and said control means whereby rotation of said flag operated means to said one angular position will disenable time lapse and mileage lapse control of said counting wheels, rotation to a second of said plurality of positions will disenable only the time lapse control and rotation to a third of said plurality of positions will enable control responsive to both time lapse and mileage lapse.

44. A taximeter as set forth in claim 43, wherein said flag operated means is rotatable about an arc of substantially ninety degrees (90°) and said three positions occur from zero (0) to ninety (90°) degrees.

45. A taximeter as set forth in claim 43, wherein said control responsive to time lapse and mileage lapse includes a clockwork mechanism, with timed driven gearing; said means interengaging the flag operated means and said control means includes resiliently biased selectively movable timed driven gearing blocking means normally resiliently biased into blocking engagement by said resilient means and adapted to be engaged by movement of said flag operated means into said third position to be moved out of blocking engagement with said gearing.

46. A taximeter as set forth in claim 45, wherein said flag operated means comprises: a rotatable flag shaft carrying a cam arbor including a camming surface and a lug portion, said camming surface comprising at least three dwells, one being offset from the second and third, corresponding to said three positions; the means interengaged between the flag operated means and said count transfer means comprising a resiliently biased lever having a cam follower engaging said camming surface; and said timed gearing blocking means includes a pivoted lever and a resiliently biased plunger adapted to engage said pivoted lever and bias it into gear blocking position including means adapted to be engaged by said cam arbor lug to move said plunger against the bias out of engagement with said pivoted lever when the cam arbor is moved from the second position to the third position.

47. A register comprising separable subassemblies consisting of a base plate and drive gear train subassembly, a fare drum and counter subassembly adapted for unitary removable attachment to said base plate, a clockwork and escapement subassembly adapted for unitary removable attachment to said base plate in juxtaposition to said fare drum and counter subassembly, a flag shaft subassembly removably mounted in said fare drum and counter subassembly and an extras drum and counter subassembly removably mounted on said fare drum and counter subassembly and a cover subassembly, all subassemblies containing means structurally and functionally interrelating one another providing a simplified compact taximeter capable of rapid assembly and disassembly.

48. A taximeter as set forth in claim 47, wherein said means comprises a cover locking post extending from the base plate, latching means contained in said cover adapted to cooperate with said latching post upon assembly of the cover on the base plate in covering relation to said fare drum and counter subassembly, said drive gear train and said clockwork and escapement subassembly and adapted to cooperate with said flag shaft subassembly upon assembly of the flag shaft subassembly to latch the cover on the post.

49. A taximeter as set forth in claim 48, wherein the locking post has an undercut head, said latching means includes a socket fitting over said head, a pawl on the inside of said cover pivotable into position under the undercut head, a lever arm attached to the inside of said cover to pivot said pawl, and means included in said flag shaft subassembly for coacting with and moving said lever with said pawl into locking arrangement with said post when said flag shaft subassembly is assembled to the taximeter.

50. A taximeter as set forth in claim 48 wherein means are provided to seal said flag shaft subassembly to the cover.

51. A taximeter comprising; fare registering means; means to operate said fare registering means; means responsive to elapsed time and/or mileage adapted to coact with and control said operating means; a manual taximeter control means having a three position flag movable back and forth in a limited arc about a pivotal axis to provide the registering means with an inoperative condition, a mileage recording condition and a mileage and time recording condition; electrical circuit means comprising terminal contacts adapted to be connected to a source of electrical power and to various electrical indicating devices for visually indicating the meter condition; circuit control means actuated by said manual taximeter control means and including two single pole double throw switches spring loaded to one position; and circuit interconnections between said terminal contacts and said switches whereby both switches in spring loaded position will complete a circuit from the power terminal to one of the remaining terminals and one of said switches being operated against the spring bias will complete a circuit from the power terminal to a second of the remaining terminals and the second of said switches being operated against the spring bias will complete a circuit from the power terminal to a third of the remaining contacts; and said manual taximeter control means structurally coacts with the switches to operate one, the other or neither against the spring bias depending on which of the three named positions the manual control is operated to; whereby a separate circuit, each adapted to be connected to an indicating device, is completed for each of said three manual control positions.

52. A taximeter as set forth in claim 51 wherein said two switches are push pin operated microswitches, the first of said switches being mounted on top of the other with the operating pins extending from coextensive sides, said circuit control means further comprises an operating lever pivoted at the top of said one switch and extending successively over the operating pins of the two switches whereby pivotal movement of the lever will sequentially push the top pin and bottom pin into switch operated position, and said manual control means coacts with said lever to move it to one of three positions corresponding to the three manual control positions whereby said lever will sequentially operate no switch, the top switch and the bottom switch, respectively.

53. A taximeter comprising a support frame; a power input gear train; fare counter drums each having a gear wheel fixed thereto; a shaft rotatably mounting said fare drums, a fare drum transfer gear assembly movably mounted in said frame; means for moving said transfer gear assembly into and out of engagement with said fare drum gear wheels; centering cam means coaxially arranged with and connected to each fare drum; cam follower means pivotally disposed on said frame, interconnected with said transfer gear assembly and adapted to move into engagement with said centering cam means when said transfer gear assembly is moved out of engagement with said fare drum gear wheels to center said cam means and thereby reset said fare drums to an initial setting; fare drum power storage means enclosed within one of the fare drums and connected to said shaft and said one fare drum; a clockwork mechanism comprising a clock main spring, a main spring winding element, a main spring drive element, and timer escapement means connecting with said spring drive element to release the main spring stored energy at a predetermined rate; a meter escapement assembly including a unidirectional drive means adapted to be connected to both the clock main spring drive element and to the power input adapter and structurally interrelated with said one fare drum to intermittently permit predetermined increments of rotation thereof by said power storage means within said one drum; and means interconnecting said power input gear train to said shaft and to said winding element whereby upon operation of said power input gear train power will be stored in said fare drum power storage means and the clock main spring will be wound.

54. In a taximeter having fare registering means actuated by an operating lever: operating lever actuating means comprising support means disposed in said meter and including means mounting said operating lever for pivotal movement in a single plane; a mileage drive gear assembly comprising a gear rotatably carried by said support means and drive wheel means journalled adjacent said mileage gear; a clock drive gear assembly comprising a gear rotatably carried by said support means and disposed adjacent said drive wheel means; an operating lever cam assemby mounted in position to cooperate with and actuate said operating lever and secured to rotate with said drive wheel means and including a cam wheel for actuating said lever along said plane; a one way drive connection between each of said respective gears and said drive wheel means adapted to impart unidirectional rotation to said operating lever cam assembly irrespective of which gear supplies the driving force comprising a cylindrical surface on said drive wheel means, a driving member fastened to and rotatable with its gear and having a substantially cylindrical surface, concentric with and closely adjacent the cylindrical surface on said drive wheel means and provided with peripherally located notches having inclined outwardly directed surfaces, means including at least one rolling means, disposed in said notches and adapted to be maintained in wedged relationship between the inclined surface of said driving member and said cylindrical surface of said drive wheel means to drive said drive wheel means upon rotation of said gear in one direction and to permit free overrunning rotation of said drive wheel means relative to said gear in the same direction, and means including an element carried by and rotating with said operating lever cam assembly for delaying actuation of said operating lever by said cam until said drive wheel means has been rotated a predetermined angular distance by rotation of the mileage and/or time gears.

55. The operating lever actuating means of claim 54 wherein said means disposed in said grooves includes spring means to bias said rolling means into wedging cooperation with the grooved surface of the driving member and the cylindrical surface of the drive wheel means.

56. A taximeter as defined in claim 54 wherein said support means includes means carrying said means pivotally mounting said operating lever and shiftable to move said operating lever in said single plane.

57. A taximeter comprising a support; fare registering means mounted on the support; an operating lever for said fare registering means operative to register increments of fare and having an inoperative position; means on said support mounting said operating lever for pivotal movement in a single plane; operating lever actuating means on said support comprising a shaft, a unidirectional elapsed time drive comprising a driving and a driven element carried by said shaft, a unidirectional elapsed mileage drive comprising a driving and a driven element carried by said shaft closely adjacent said unidirectional elapsed time drive, both of said driven elements being structurally interconnected to rotate as a unit, an operating lever cam assembly carried by said shaft closely adjacent said unidirectional drives and rotated by said driven elements and adapted to cooperate with one end of said operating lever to actuated said operating lever along said single plane for registering increments of fare on said fare registering means in response to rotation of said driven means by said time and/or mileage drive; the driving and driven elements of each unidirectional drive comprising concentric elements having juxtaposed concentric surfaces one of which is provided with inclined ways, rolling means disposed on said ways and adapted to be wedged between the inclined ways of said one element and the concentric surface of the other element upon rotation of said driving elements in one direction and to permit free over-running rotation of said driven element relative to one of said driving elements when rotation of said one driving element in said one direction is disrupted and spring means to bias said rolling means into wedging cooperation; means including a manual control means and means coacting with said manual control means, said operating lever and said registering means operable upon movement of the manual control means to one position to shift said operating lever along said single plane to its inoperative position and to disengage the registering means; means including an element carried by and rotating with said operating lever cam assembly for delaying actuation of said operating lever by said lever cam assembly until an initial fare registration has been utilized by a predetermined lapse of mileage and/or time rendered operable by shifting of said operating lever to its inoperative position; and means coacting with said fare registering means rendered operable upon shifting of said manual control means to said one position to reset said fare registering means to said initial fare registration.

58. In a taximeter comprising a support, fare registering means mounted on said support, an operating lever for said fare registering means operative to register increments of fare and having an inoperative position, means mounting said operating lever for pivotal movement only along a single plane, operating lever actuating means on said support comprising a shaft, a uni-directional elapsed time drive on said shaft, a uni-directional elapsed mileage drive on said shaft, closely adjacent said uni-directional elapsed time drive, an operating lever cam assembly carried by said shaft closely adjacent and rotated by said uni-directional drives and adapted to cooperate with one end of said operating lever to actuate said operating lever along said single plane for registering increments of fare on said fare registering means in response to rotation by said time and/or mileage drive: a manual control means and means coacting with said manual means including a pivotal mounting for said pivotal support of said operating lever operable upon movement of the manual control means to one position to shift said operating lever along said single plane to its inoperative position and to disengage and reset the registering means; and means including an element carried by and rotating with said operating lever cam assembly for delaying actuation of said operating lever by said lever cam assembly until an initial fare registration has been utilized by a predetermined lapse of mileage and/or time, rendered operable by shifting of said operating lever to its inoperative position.

59. Mounting means for mounting a taximeter, having a mileage drive input and electrical terminals located in its base, on the dashboard of a vehicle comprising: a lower adapter provided with means for fastening it to the lower edge of the dashboard, support tube means extending vertically from said adapter and fastened to said taximeter base and providing a housing for a mileage drive cable connected to the mileage drive input and electrical wiring connecting said electrical terminals to the taxicab power source, and means on the rear of said taximeter for supporting engagement with the top of the dashboard.

60. Mounting means as defined in claim 59 wherein said means on the rear of said taximeter comprises at least one rubber pad having fixed thereto at least one permanent magnet.

References Cited in the file of this patent

UNITED STATES PATENTS

| Number | Name | Date |
|---|---|---|
| 936,559 | Pearson | Oct. 12, 1909 |
| 1,011,156 | Chase | Dec. 12, 1911 |
| 1,464,882 | Palmer | Aug. 14, 1923 |
| 1,786,745 | Gehlen | Dec. 30, 1930 |
| 1,794,808 | Tingley | Mar. 3, 1931 |
| 1,827,139 | Brun | Oct. 13, 1931 |
| 1,874,962 | Gluck et al. | Aug. 30, 1932 |
| 2,324,778 | Julius et al. | July 20, 1943 |
| 2,428,080 | Horn | Sept. 30, 1947 |
| 2,543,531 | Lang | Feb. 27, 1951 |
| 2,562,635 | Nicholson et al. | July 31, 1951 |
| 2,566,610 | Handley | Sept. 4, 1951 |
| 2,596,164 | Palmer | May 13, 1952 |
| 2,616,622 | Miller | Nov. 4, 1952 |
| 2,650,757 | Weisinger | Sept. 1, 1953 |

FOREIGN PATENTS

| Number | Country | Date |
|---|---|---|
| 427,577 | Great Britain | Apr. 26, 1935 |